US012205412B2

(12) United States Patent
Konanur Ramachandra

(10) Patent No.: US 12,205,412 B2
(45) Date of Patent: Jan. 21, 2025

(54) SYSTEM AND METHOD FOR VERIFYING AND COUNTING VOTES CAST BY VOTERS

(71) Applicant: Satyamurthy Konanur Ramachandra, Bangalore (IN)

(72) Inventor: Satyamurthy Konanur Ramachandra, Bangalore (IN)

( * ) Notice: Subject to any disclaimer, the term of this patent is extended or adjusted under 35 U.S.C. 154(b) by 390 days.

(21) Appl. No.: 17/623,841

(22) PCT Filed: Jul. 20, 2020

(86) PCT No.: PCT/IN2020/050628
§ 371 (c)(1),
(2) Date: Dec. 29, 2021

(87) PCT Pub. No.: WO2021/019554
PCT Pub. Date: Feb. 4, 2021

(65) Prior Publication Data
US 2022/0358805 A1    Nov. 10, 2022

(30) Foreign Application Priority Data
Jul. 30, 2019   (IN) .............................. 201941030737

(51) Int. Cl.
*G07C 13/02*   (2006.01)
*G06F 21/64*   (2013.01)
(Continued)

(52) U.S. Cl.
CPC ............. *G07C 13/02* (2013.01); *G06F 21/64* (2013.01); *H04L 9/0897* (2013.01);
(Continued)

(58) Field of Classification Search
CPC ......... G07C 13/02; G07C 13/00; G06F 21/64; H04L 9/0897; H04L 9/3242; H04L 2209/463
See application file for complete search history.

(56) References Cited

U.S. PATENT DOCUMENTS 7,458,512 B2 * 12/2008 Colson ................... G07C 13/00
                                                            235/386
2004/0046021 A1 * 3/2004 Chung ................... G06Q 50/34
                                                            235/386
(Continued)

FOREIGN PATENT DOCUMENTS

KR       20220126895 A  *  9/2022  ............. G06Q 50/26
WO   WO-2021019554 A1  *  2/2021  ............. G06F 21/64

OTHER PUBLICATIONS

International Search Report received in PCT/IN2020/050628, mailed Nov. 12, 2020, 2 pages.
(Continued)

*Primary Examiner* — John W Hayes
*Assistant Examiner* — Edgar R. Martinez-Hernandez
(74) *Attorney, Agent, or Firm* — Klarquist Sparkman, LLP

(57) ABSTRACT

In an embodiment, a computer implemented method for verifying and counting a vote cast by a voter is provided. The method includes recording, by a ballot machine, the vote cast by the voter via a first I/O interface for a corresponding candidate out of a plurality of candidates. An encryption of a vote tag is generated based on a preceding tag, a unique key generated in response to initializing the ballot machine and the candidate constant assigned based on the vote cast by the voter for the corresponding candidate. The encrypted vote tag is scanned to retrieve information of the vote tag from the encrypted vote tag. A confirmation including a replication of the vote recorded at the ballot machine for the corresponding candidate, in response to scanning the encrypted vote tag is provided by the verification machine. The total number of vote tags recorded are counted to tabulate results.

20 Claims, 15 Drawing Sheets

(51) Int. Cl.
*G07C 13/00* (2006.01)
*H04L 9/08* (2006.01)
*H04L 9/32* (2006.01)

(52) U.S. Cl.
CPC ............ *H04L 9/3242* (2013.01); *G07C 13/00* (2013.01); *H04L 2209/463* (2013.01)

(56) References Cited

U.S. PATENT DOCUMENTS

| | | | | |
|---|---|---|---|---|
| 2005/0211783 | A1* | 9/2005 | Chou | G07C 13/00 235/472.03 |
| 2006/0169778 | A1* | 8/2006 | Chung | G07C 13/00 235/386 |
| 2008/0110985 | A1* | 5/2008 | Cohen | G07C 13/00 235/386 |
| 2008/0164329 | A1* | 7/2008 | Piorun | G07C 13/00 235/50 B |
| 2009/0072031 | A1* | 3/2009 | Cardone | G07C 13/00 726/16 |
| 2009/0121018 | A1* | 5/2009 | Bauchot | G06K 19/07345 235/386 |
| 2009/0166417 | A1* | 7/2009 | Dammann | G07C 13/00 235/386 |
| 2018/0350180 | A1* | 12/2018 | Onischuk | G07C 13/00 |
| 2022/0406115 | A1* | 12/2022 | Mazza | G07C 13/00 |

OTHER PUBLICATIONS

Written Opinion received in PCT/IN2020/050628, mailed Nov. 12, 2020, 7 pages.
Jordi Puiggali, "Voter-Verifiability through Independent Electronic Verification Modules," Sep. 15, 2005, 18 pages.
Ali Fawzi Najm Al-Shammari et al., "A Synthesis of Vote Verification Methods in Electronic Voting Systems," Jun. 2014, 26 pages.
Puiggalia et al., "Independent Voter Verifiability for Remote Electronic Voting," in Proceedings of the Second International Conference on Security and Cryptography, pp. 333-336 (2007), 4 pages.

* cited by examiner

SYSTEM AND METHOD FOR VERIFYING AND COUNTING VOTES CAST BY VOTERS

CROSS REFERENCE TO RELATED APPLICATIONS

This is the U.S. National Stage of International Application No. PCT/IN2020/050628, filed Jul. 20, 2020, which was published in English under PCT Article 21(2), which in turn claims the benefit of India application No. 201941030737, filed in India Jul. 30, 2019. The applications are hereby incorporated herein in their entirety.

FIELD OF THE INVENTION

The present invention relates to voting systems, and more particularly relates to system and method for verifying and counting votes cast by voters.

BACKGROUND OF THE INVENTION

Any voting system must satisfy two basic requirements, i.e. system integrity and voter privacy. System integrity is ensuring votes are cast and counted as intended by the voters that they are not modified or corrupted. Voter privacy involves keeping the votes confidential, allowing a voter to freely vote for a candidate contesting an election resisting any coercion or force. Non-cryptographic voting systems satisfy these two requirements using procedural security. Whereas electronic voting systems, use operations and properties of cryptographic systems to meet this goal. A good voting scheme must provide, transparency of voting and the result tabulation, verifiability, accountability and usability of the machine.

It is pertinent to note that voter privacy and verifiability are conflicting requirements. Enabling a voter to verify his vote—that it was recorded and counted as intended, must include restrictions to prevent the voter from discovering how others voted. The sheer size of elections in major countries such as U.S.A and India forced the Election Authorities in their respective countries to move away from the traditional paper ballot-based voting to electronic voting in the last decade or so.

In India for example, the Indian electronic voting machine (EVM) is a simple Direct Recording Electronic (DRE) type of voting machine. Its simplicity of design, ease of use, build robustness, and low cost (about 250$ each) has made it a practical solution for the Indian elections. And since 2004 all elections in India have been conducted using EVMs. This move to full electronic voting has brought in a number of benefits, in terms of lesser costs, streamlined logistics, and increased security by mitigating attacks like booth capturing. However, following protests, incidents and litigation, the Supreme Court of India directed the election commission to use verifiable paper audit trails (VVPATs) for all EVMs. While paper audit trials enhance the security of the election system, they cannot guarantee integrity of elections in all scenarios. The paper trails are counted/tabulated for a sample of EVM's and also when EVM results are suspected and challenged. It is pertinent to note that the sample of EVM's are not defined for which the paper trails are counted/tabulated, instead random samples of EVM are chosen for conducting the paper trails counting. Further, the usage of paper trails for counting/tabulating as discussed above is only when the results are suspected and challenged. In situations such as an attack modifying EVM results in a non-suspicious way may never be detected. In this regard, usage of the paper trails alone does not ensure system integrity, transparency and accountability of the elections.

Systems such as DREs and VVPATs rely on a chain of commands to provide transparency and accountability. However, these systems do not provide any means for verifiability. An alternative to these voting technologies are the End to End Verifiable voting (E2E) systems. E2E systems offer integrity of elections independent of system or software aspects of a system. This system is based on open cryptographic techniques, thereby enabling verification of votes.

Further, a number of cryptographic E2E voting systems such as the Pret-e-voter, Punch Scan, Bingo Voting have been proposed. These use cryptographic proofs to prove integrity of elections. However, the voting systems need to be not only secure, but also need to be seen, perceived and understood to be secure. Further, they need to be practical to realize and use. Therefore, the aforesaid systems, even if they possess solutions to prove integrity and privacy of elections, do not satisfy needs for simple/widespread understanding and practicality of use.

In view of the above, there is a dire need for systems and methods for providing integrity and voting privacy during an election scenario.

BRIEF SUMMARY OF THE INVENTION

One or more embodiments of the present invention, provide system and method for verifying and counting votes cast by voters.

In one aspect of the invention, a computer implemented method for verifying a vote cast by a voter is provided. The method includes recording, by a ballot machine, the vote cast by the voter via a first I/O interface for a corresponding candidate out of a plurality of candidates. Thereafter, an encryption of a vote tag is generated based on a preceding tag, a unique key generated in response to initializing the ballot machine and the candidate constant assigned based on the vote cast by the voter for the corresponding candidate. The encrypted vote tag is scanned by the verification machine to retrieve information of the vote tag and a confirmation is provided of the vote recorded at the ballot machine for the corresponding candidate in response to scanning the encrypted vote tag.

In another aspect of the invention, a system for verifying a vote cast by a voter is provided. The system comprises at least one ballot machine and at least one verification machine. The ballot machine includes a first memory to record a vote cast by a voter via a first I/O interface for a corresponding candidate out of a plurality of candidates displayed on the first I/O interface. The vote recorded is stored along with a corresponding candidate constant assigned to the candidate. The plurality of candidates are assigned a plurality of candidate constants, respectively. A first computer processor communicably coupled to the first memory is, configured to generate an encryption of a vote tag based on a preceding tag, a unique key generated in response to initializing the ballot machine and the corresponding candidate constant assigned thereof in response to the vote cast for the candidate.

In yet another aspect of the invention, a system for casting a vote by a voter is provided. The system comprises a first memory to record a vote cast by a voter via a first I/O interface for a corresponding candidate out of a plurality of candidates displayed on the first I/O interface. The vote recorded is stored along with a corresponding candidate constant assigned to the candidate. The plurality of candidates are assigned a plurality of candidate constants, respectively. A first computer processor communicably coupled to the first memory is configured to generate an encryption of a vote tag based on a preceding tag, a unique key generated in response to initializing the ballot machine and the corresponding candidate constant assigned thereof in response to the vote cast for the candidate.

In yet another aspect of the invention, a computer implemented method for casting a vote by a voter is provided. The method includes recording, by a ballot machine, the vote cast by the voter via a first I/O interface for a corresponding candidate out of a plurality of candidates. The vote recorded is assigned a candidate constant. The plurality of candidates are assigned a plurality of candidate constants, respectively. The ballot machine generates, an encryption of a vote tag based on a preceding tag, a unique key generated in response to initializing the ballot machine and the candidate constant assigned based on the vote cast by the voter for the corresponding candidate.

In yet another aspect of the invention, a computer implemented method for identifying a chain of a total number of votes cast by voters is provided. The method includes receiving at a computer server, via a communication transceiver, at least an initial vote tag and a final vote tag from a data source over the internet. The at least initial vote tag and the final vote tag forming part of the chain representing a total number of votes cast by voters. The computer server including the communication transceiver, a storage unit and one or more processor coupled to a memory. The one or more processors based on instructions stored on the memory is configured for generating, a tree including a plurality of chains, each chain out of the plurality of chains including multiple sets of possible verification vote tags based on the initial vote tag and the total number of votes cast by voters. Each set of the multiple sets including a plurality of possible verification tags being generated for each candidate out of a plurality of candidates contesting an election. The final vote tag is compared with the multiple sets of possible verification tags and identifying, the chain of the total number of votes cast by the voters from the tree. The chain is identified from the plurality of chains based on a result of match of any one of the possible verification tag of the chain with the final vote tag based on the comparison. The chain indicates the plurality of vote tags including the initial vote tag, the final vote tag and one or more intermediate vote tags.

In yet another aspect of the invention, a system for identifying a chain of a total of number of votes cast by voters is provided. The system comprises a computer server including one or more processors, a memory, a communication transceiver and a storage unit. At least an initial vote tag and a final vote tag are received at the communication transceiver from a data source over the internet. The at least initial vote tag and the final vote tag form part of the chain representing a total number of voters cast by voters. A tree generator unit of the processor is configured to generate a tree including multiple sets of possible verification vote tags based on the initial vote tag and the total number of votes cast by the voters. Each set of the multiple sets including a plurality of possible verification tags being generated corresponding to a plurality of candidates contesting an election. The comparing unit of the processor is configured to compare the final vote tag with the multiple set of possible verification tags. The identification module of the processor is configured to identify the chain from the tree based on a result of match of any one of the possible verification tag with the final vote tag based on the comparison. The chain indicating the plurality of vote tags including the initial vote tag, the final vote tag and one or more intermediate vote tags.

In yet another aspect of the invention, a computer implemented method for counting one or more votes cast by voters is provided. The method includes receiving at a computing device, via a communication transceiver, a chain including a total number of votes from a data source over the internet. The computing device includes one or more processors coupled to a memory, the communication transceiver and a storage unit. The total number of votes are stored at the storage unit as a plurality of vote tags. Each vote tag out of the plurality of vote tags is generated based on a preceding tag. The one or more processors based on instructions stored on memory is configured for generating, a plurality of possible verification tags for each of the vote tag. The plurality of possible verification tags is generated based on the preceding tag of the vote tag. Each possible verification tag being generated for each candidate out of a plurality of candidates contesting an election. The plurality of possible verification tags is compared with the vote tag. Thereafter, a candidate constant is identified based on a result of match of any one of the possible verification tags with the vote tag based on the comparison. A vote for the candidate is confirmed and recorded based on the identified candidate constant thereof.

In yet another aspect of the invention, a system for counting one or more votes cast by voters is provided. The system comprises a computing device including one or more processors, a memory, a communication transceiver and a storage unit. The communication transceiver receives, a chain including a total number of votes, the total number of votes being stored at the storage unit as a plurality of vote tags. Each vote tag out of the plurality of vote tags being generated based on a preceding tag. Thereafter, a generation unit of the processor is configured to generate a plurality of possible verification tags for each of the vote tag. The plurality of possible verification tags are generated based on the preceding tag of the respective vote tag. Each possible verification tag being generated for each of the candidate out of the plurality of candidates contesting the election. A comparing unit of the processor is configured to compare the plurality of possible verification tags with the vote tag. An identification unit of the processor is configured to identify a candidate constant based on a result of match of any one of the possible verification tags with the vote tag and, a computing unit of the processor is configured to record and confirm a vote for the candidate at the storage unit based on the identified candidate constant thereof.

Other features and aspects of this invention will be apparent from the following description and the accompanying drawings. The features and advantages described in this summary and in the following detailed description are not all-inclusive, and particularly, many additional features and advantages will be apparent to one of ordinary skill in the relevant art, in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

Reference will be made to embodiments of the invention, examples of which may be illustrated in the accompanying figures. These figures are intended to be illustrative, not limiting. The accompanying figures, which are incorporated in and constitute a part of the specification, are illustrative of one or more embodiments of the disclosed subject matter and together with the description explain various embodiments of the disclosed subject matter and are intended to be illustrative. Further, the accompanying figures have not necessarily been drawn to scale, and any values or dimensions in the accompanying figures are for illustration purposes only and may or may not represent actual or preferred values or dimensions. Although the invention is generally described in the context of these embodiments, it should be understood that it is not intended to limit the scope of the invention to these particular embodiments.

DETAILED DESCRIPTION OF THE INVENTION

Reference will now be made in detail to specific embodiments or features, examples of which are illustrated in the accompanying drawings. Wherever possible, corresponding or similar reference numbers will be used throughout the drawings to refer to the same or corresponding parts. References to various elements described herein, are made collectively or individually when there may be more than one element of the same type. However, such references are merely exemplary in nature. It may be noted that any reference to elements in the singular may also be construed to relate to the plural and vice-versa without limiting the scope of the invention to the exact number or type of such elements unless set forth explicitly in the appended claims. Moreover, relational terms such as first and second, and the like, may be used to distinguish one entity from the other, without necessarily implying any actual relationship or between such entities.

Various embodiments of the invention provide system and method for verifying and counting votes cast by voters. The present invention is configured to provide system and method for verifying and counting votes cast by voters, thereby maintaining integrity while also ensuring voter privacy during an election scenario.

Figure 1:
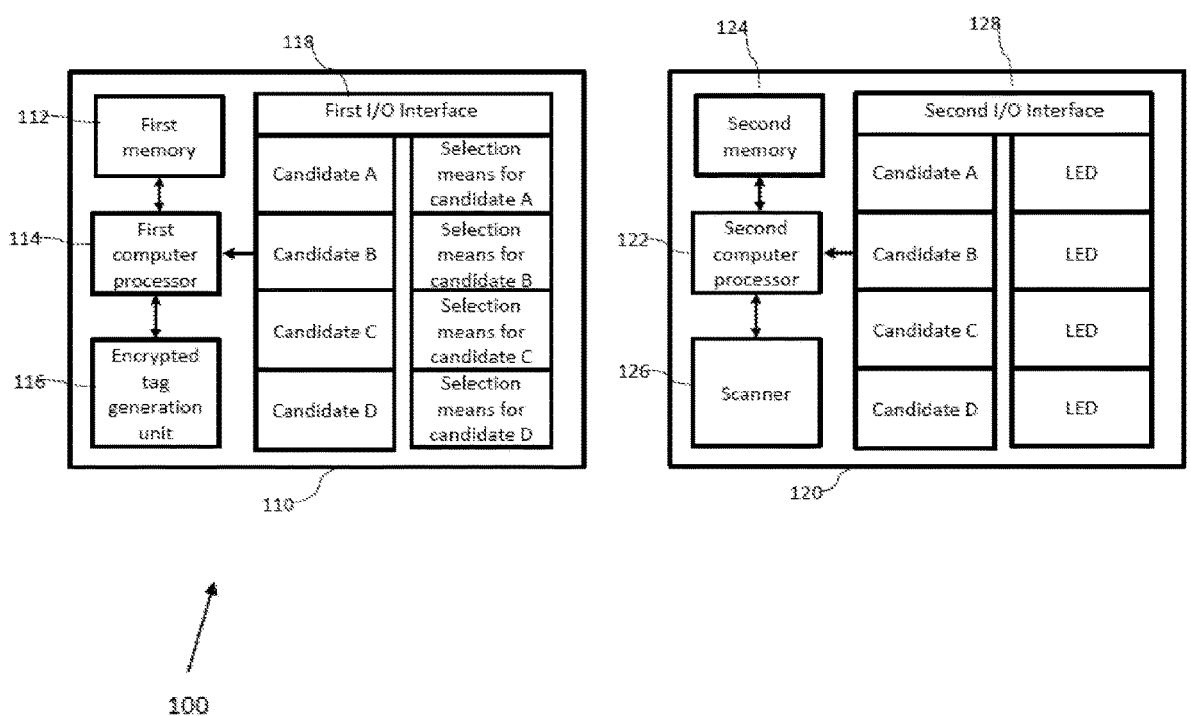
FIG. 1 is a schematic representation of a system for verifying a vote cast by a voter, according to one or more embodiments of the present invention.

FIG. 1 illustrates a schematic representation of a system 100 for verifying a vote cast by a voter, according to one or more embodiments of the present invention. The system, as disclosed herein, includes at least one ballot machine 110 and at least one verification machine 120 for a selected booth wherein election would be conducted. The at least one ballot machine 110, hereinafter being referred to as the ballot machine 110 includes a first memory 112, a first computer processor 114, an encrypted tag generation unit 116 and a first I/O interface 118.

Further, the at least one verification machine 120, hereinafter being referred to as the verification machine 120 includes a second computer processor 122, a second memory 124, a scanner 126 and a second I/O interface 128.

The first computer processor and the second processor, in general the processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory.

The first I/O interface 118 and the second I/O interface 128, in general I/O interface may include a variety of software and hardware interfaces, for example, a web interface, a graphical user interface, touchpads and the like. The I/O interface, i.e. the first I/O interface 118 and the second I/O interface 128 may allow a user to interact with the first computer processor 114 and the second computer processor 122 directly or through a user device.

The first memory 112 and the second memory 124, in general the memory and any other storage means and/or units may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In accordance with an embodiment of the invention, within the at least one ballot machine, the first computer processor 114 is in communication with each of the first I/O interface 118, the first memory 112 and the encrypted tag generation unit 116.

In accordance with an embodiment of the invention, within the at least one verification machine 120, the second computer processor 122 is in communication with each of the second I/O interface 128, the second memory 124 and the scanner 126.

With reference to FIG. 1, the ballot machine 110 and the verification machine 120 are not adapted to communicate with each other, i.e. the ballot machine 110 and the verification machine 120 are independent of each other, whatsoever. Advantageously, this ensures that integrity and the privacy of the system 100 is maintained.

In an alternate embodiment, the ballot machine 110 can function as an independent standalone machine. For example, the election commission can just set up the ballot machine without having the verification machine for verifying the vote cast by the voter.

Once an election is planned for a particular territory, the booth is selected and a plurality of candidates contesting are determined, the ballot machine 110 and the verification machine 120 are initialized for the selected booth. Each of the ballot machine 110 and the verification machine 120 is initialized by communicably coupling with one or more external devices. The one or more external devices include information relating to unique keys, a plurality of candidate constants corresponding to the plurality of candidates contesting the election and the initialization constant.

Figure 2:
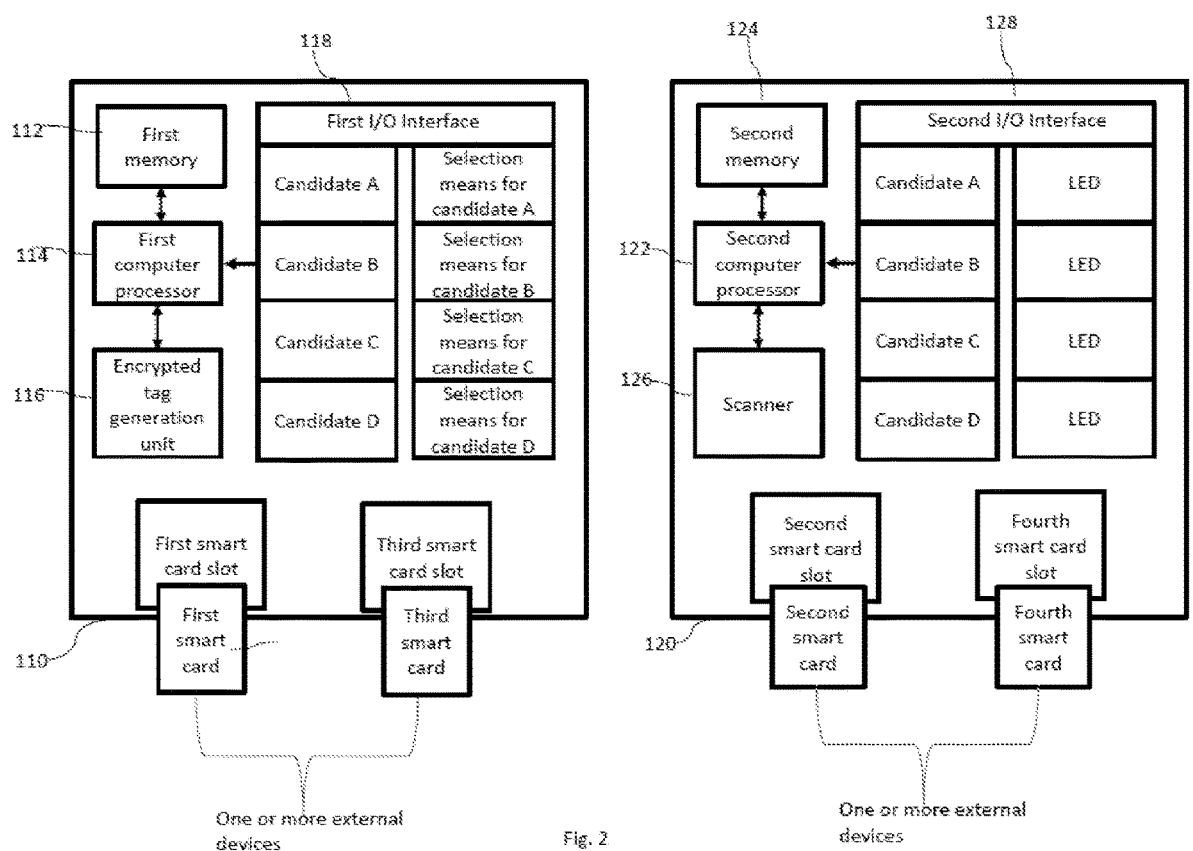
FIG. 2 is a block diagram of a system for verifying a vote cast by a voter communicably coupled to one or more external devices, according to one or more embodiments of the present invention.

In a preferred embodiment, as shown in FIG. 2, the ballot machine 110 and the verification machine 120 are initialized by inserting the one or more external devices such as, but not limited to, a first smart card into a first smart card slot of the ballot machine and a second smart card into a second smart card slot of the verification machine, respectively. The first smart card and the second smart card are embedded with identical information including the unique keys, the plurality of candidate constants corresponding to the plurality of candidates contesting the election and the initialization constant.

In another embodiment of the invention, the one or more external devices may be peripheral devices. The peripheral devices can be one of, but not limited to, disk drive, USB flash drive, memory card and tape drive. These peripheral devices may be connected with each of the ballot machine 110 and the verification machine 120 via ports provided to the first I/O interface 118 and the second I/O interface 128, respectively.

In yet another embodiment of the invention, the one or more external devices can be one of, but not limited to, secured mobile phone, laptops, desktops capable of connecting with each of the ballot machine and the verification machine via wired and/or wireless connections including one of, but not limited to, local area network (LAN), Bluetooth, WIFI and infrared.

The information embedded within the one or more external devices, i.e. the plurality of candidate constants and the initialization constant are published by the election authority or by the first computer processor 112 of the ballot machine 110, upon connecting with each of the ballot machine 110 and the verification machine 120. However, the unique keys are maintained as a secret and not published. By doing so, the only components which are required to be protected before voting process commences at the booth are the one or more external devices.

In accordance with an embodiment of the invention, the unique key loaded into the first smart card and the second smart card is identical.

In an alternate embodiment, the unique key loaded into the first smart card and the second smart card are not identical. In either the first or the second smart card, a public key is loaded and in another a private key is loaded. The public and the private key form an asymmetric key pair constituting a signature-based technique.

In an embodiment of the invention, the candidate constants and the initializing constant are published on one of the first I/O interface 118 of the ballot machine 110, the second I/O interface 128 of the verification machine 120 and an election commission portal accessible by general public. Further, the plurality of candidates displayed on the second I/O interface 128 is in a pre-defined order. When the plurality of candidates are displayed in the pre-defined order, then the system 100 is said to operate in a normal mode. There is a second mode called as a mixed mode, which will be illustrated later.

Figure 3:
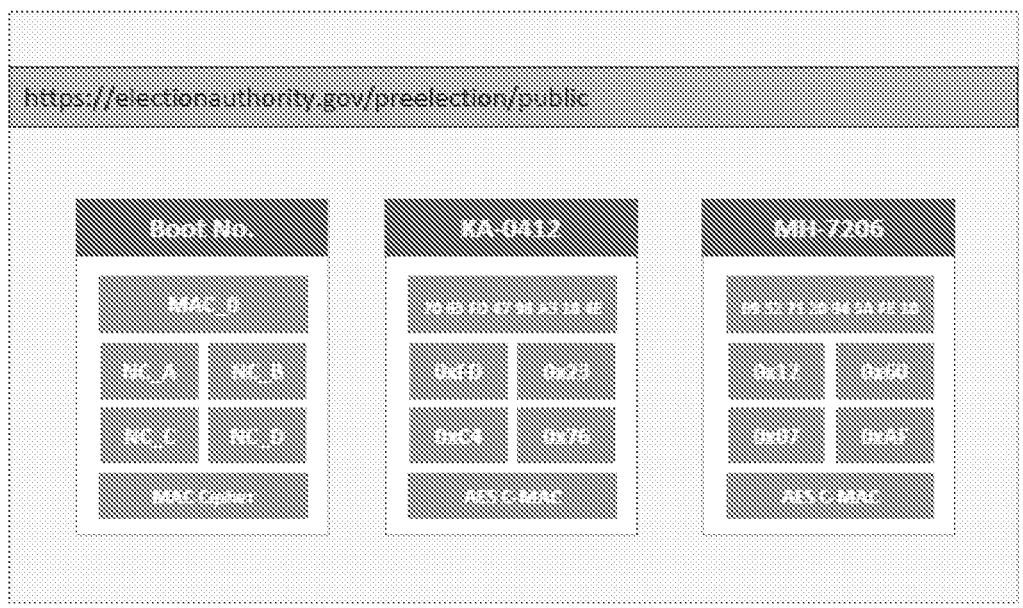
FIG. 3 is an exemplary illustration of a sample page published on the online portal of the election commission.

FIG. 3 illustrates a sample page published on the online portal of the election commission. The page indicating the candidate constants corresponding to the candidates contesting the election, the initialization constant and the respective selected booth. In FIG. 3, one example indicates the candidate constants as NC_A, NC_B, NC_C and NC_D assigned to the corresponding candidates A, B, C and D respectively. Further, the initialization constant is indicated as MAC_0 and the booth number can also be mentioned for example KA-0412.

Once the plurality of candidate constants and the initialization constants are published, the system 100 including the ballot machine 110 and the verification machine 120 is ready to be used for voting by a plurality of voters authorized to vote in the selected booth. In the election scenario, each of the ballot machine 110 and the verification machine 120 are placed in such a manner that there are no possibilities of communication between them. Further, each of the ballot machine 110 and the verification machine 120 are placed in an enclosed space to maintain privacy of the voter. The vote is required to be cast via the first I/O interface 118 for a corresponding candidate displayed on the first I/O interface 118. With reference to FIG. 1, the first I/O interface 118 of the ballot machine 110 is configured to display a plurality of candidates contesting the election and corresponding to each of these candidates, selection means such as, but not limited to, buttons or touchpad is provided. Therefore, the voter is required to select the candidate of preference out of the plurality of candidates displayed on the first I/O Interface 118. By selecting the corresponding candidate, a vote is recorded.

The vote cast by the voter is recorded at the first memory 114 of the ballot machine 110. The vote is recorded by storing the vote along with the corresponding candidate assigned to the candidate for whom the voter cast the vote.

The first computer processor 112 of the ballot machine 110 is configured to generate an encryption of a vote tag based on a preceding tag, the unique key and the corresponding candidate constant assigned thereof in response to the vote cast for the candidate out of the plurality of candidates displayed on the first I/O interface 118.

In an embodiment, the preceding tag is the previous tag generated with respect to a previous vote cast by a different voter. With respect to a first vote cast by a first voter, the preceding tag can be the tag generated in response to the initialization constant.

The encrypted vote tag includes information of the preceding tag, the unique key and the corresponding candidate constant assigned thereof in response to the vote cast for the candidate by the voter.

In accordance with an embodiment of the invention, in response to each vote cast by the voter, the first memory 114 stores the corresponding encrypted vote tag. Pursuant to concluding the voting process, the total number of votes recorded, i.e. the plurality of vote tags forming a chain is transmitted to an external secure data server (not shown).

In an embodiment, the encrypted vote tag is provided to the voter as a voting receipt. The voting receipt is generated by the encrypted tag generation unit such as, but not limited to, a printer present within the ballot machine 110.

In another embodiment of the invention, the encrypted vote tag is transmitted to a communication unit operated by the voter. The communication unit can be one of, but not limited to, a mobile phone, a laptop and a desktop. The encrypted vote tag can be transmitted to the communication unit of the voter via wired and/or wireless connections in response to the voter providing personal details including one of, but not limited to, a phone number and email-id. In an embodiment, the first I/O interface may enable the first computer processor 112 to communicate with the communication unit. The first I/O interface 118 may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

In an embodiment of the invention, the voter presents the encrypted vote tag at the verification machine 120. Upon presenting the encrypted vote tag at the verification machine 120, the scanner 126 of the verification machine 120 scans the encryption of the vote tag to retrieve information of the vote tag. In an embodiment of the invention, presenting the encrypted vote tag at the verification machine 120 is optional and not mandatory. The encrypted vote tag is presented at the verification machine 120 by the voters only when they want to verify if the vote cast by them is recorded.

Once the encrypted vote tag is scanned, the second computer processor 124 of the verification machine 120 is configured to provide a confirmation including a replication of the vote recorded at the ballot machine 110 for the corresponding candidate.

In an embodiment, the second computer processor 124 of the verification machine 120 provides confirmation of the vote recorded at the ballot machine 110 by one of, but not limited to, transmitting a signal to illuminate a light emitting diode (LED) corresponding to the candidate on the on the second I/O interface 128 for which the voter casted the vote. As such, as shown in FIG. 1, the verification machine 120 includes a plurality of light emitting diodes (LED) corresponding to the plurality of candidates contesting the election.

In accordance with an embodiment of the invention, the system 100 can be configured to operate in the mixed mode. The system 100 as illustrated until now was configured to operate in the normal mode.

In the mixed mode scenario, the ballot machine 110 and the verification machine 120 are both configured to operate in the mixed mode. For example, a first setting on the first I/O interface 118 of the ballot machine 110 and a second setting on the second I/O interface 128 of the verification machine 120 are configured to operate from the normal mode to the mixed mode, if they were configured to operate in the normal mode before. Further, in the mixed mode scenario, the one or more external devices include instructions specific to the mixed mode. Accordingly, the first computer processor 112 executes instructions present in the one or more external devices to generate a dynamic order of the plurality of candidates displayed on the first I/O interface 118.

As shown in FIG. 2, the one or more external devices can be smart cards. For example, the first smart card is inserted into the first smart card slot of the ballot machine 110. Similarly, the second smart card is inserted into the second smart card slot of the verification machine 120. Further, specific to the mixed mode, a third smart card is inserted into a third smart card slot of the ballot machine. Similarly, a fourth smart card is inserted into a fourth smart card slot of the verification machine 120. The third smart card and the fourth smart card include instructions and mix key pertaining to the order that is required to be dynamically generated. The instructions follow a deterministic technique to mix the order of the candidates dynamically on the second I/O interface 128. Hence, when the third smart card and the fourth smart card are inserted into their respective slots at the ballot machine 110 and the verification machine 120, respectively, the first computer processor 112 and the second computer processor 128 can read those instructions and execute the dynamically generated order. Therefore, the encryption of the vote tag generated by the first computer processor 112 in response to the vote recorded at the ballot machine 110, will include information pertaining to the preceding tag and the dynamically generated order. Further, when the encrypted tag is presented at the verification machine 120, the second computer processor 124 based on reading the encrypted tag, provides confirmation to the voter of the vote recorded at the ballot machine 110, irrespective of the dynamically generated order of the plurality of candidates. Advantageously, the mixed mode ensures that additional security is provided to prevent any tampering/modification of the vote recorded at the ballot machine 110. For example, let us consider that the candidates A, B, C and D are contesting the election and they are displayed in the same order on the second I/O interface 128. Pursuant to changing the setting to mixed mode, if the instructions on the third and the fourth card is to shift the candidate order to one place in a clockwise or an anti-clockwise direction, then the candidate order may be changed to B, A, C and D.

In an alternate embodiment, the mix key present in the third and the fourth smart cards can be used to generate both the dynamic order and the pre-defined order.

Figure 4A:
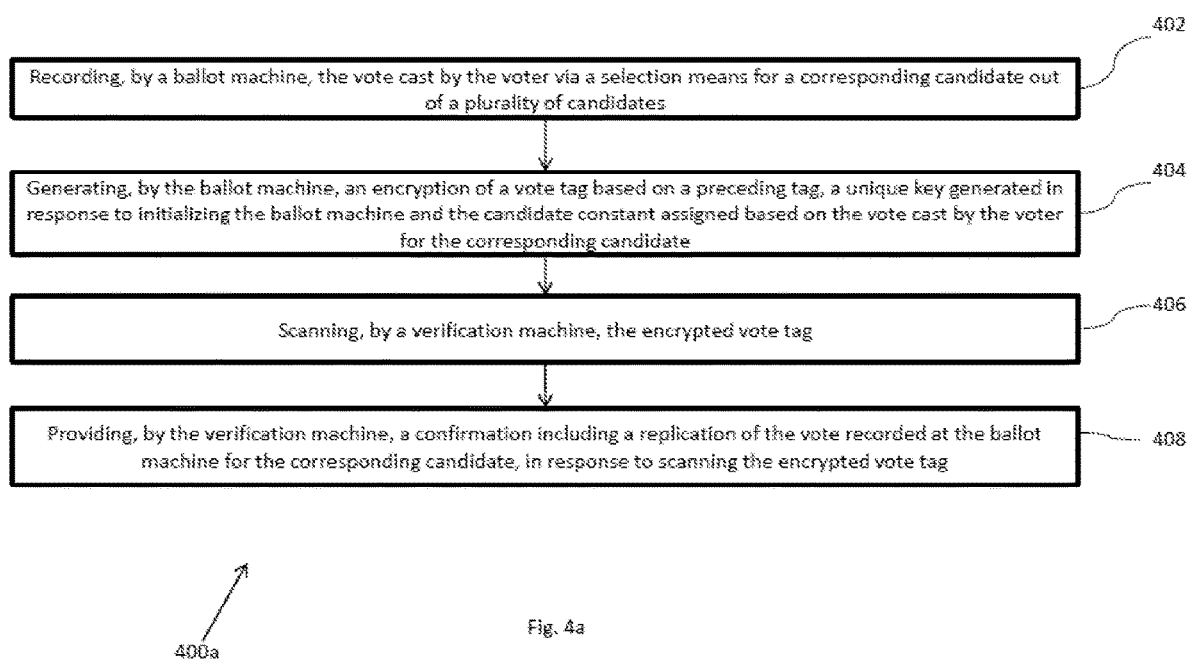
FIG. 4a shows a flowchart of a computer implemented method for verifying a vote cast by a voter, according to one or more embodiments of the present invention.

FIG. 4a shows a flowchart of a computer implemented method for verifying a vote cast by a voter in accordance with an embodiment of the invention. For the purpose of description, the method 400a is described along with the system 100 as illustrated in FIG. 1. The method 400a comprises the steps as indicated below:

At step 402, the vote cast by the voter via the first I/O interface 118 for a corresponding candidate out of a plurality of candidates is recorded at the first memory 114 of the ballot machine 110. The vote recorded is assigned a candidate constant, wherein the plurality of candidates are assigned a plurality of candidate constants, respectively. The first I/O interface 118 of the ballot machine 110 is configured to display a plurality of candidates contesting the election and corresponding to each of these candidates, a selection means such as, but not limited to, a button or touchpad is provided. In an alternate embodiment, each of the candidates contesting the election are represented as a candidate indicator. The candidate indicator is located in close proximity to the button or the touchpad of the first I/O interface, however the candidate indicator does not form part of the first I/O interface. The voter is required to select the button or the touchpad corresponding to the candidate of preference out of the plurality of candidates displayed. By selecting the corresponding button or a touchpad, a vote is recorded. The vote cast by the voter is recorded at the first memory 114 of the ballot machine 110. The vote is recorded by storing the vote along with the corresponding candidate assigned to the candidate for whom the voter cast the vote. In an embodiment, the vote is stored along with the corresponding candidate constant in the first memory 114 such as, but not limited to, a non-volatile memory. In this scenario, the first memory 114 may store all the votes until the voting process is concluded. Thereafter, all the votes recorded may be transmitted to an external data source via wired and/or wireless communication. In an alternate embodiment, all the votes recorded may be transferred to a peripheral device by the election commission and transferred to the external data source by connecting the peripheral devices to the data source.

In an alternate embodiment, the vote is stored along with the corresponding candidate constant in the first memory 114 such as, but not limited to, a random access memory (RAM) until a subsequent vote is recorded. Thereafter, the vote is transmitted to an external data source via wired and/or wireless communication.

At step 404, an encryption of a vote tag is generated by the first computer processor 112 of the ballot machine 110. The encryption of the vote tag is generated based on a preceding tag, a unique key generated in response to initializing the ballot machine 110 and the candidate constant assigned based on the vote cast by the voter for the corresponding candidate. The preceding tag is the previous tag generated with respect to a previous vote cast by a different voter. The encrypted vote tag includes information of the preceding tag, the unique key and the corresponding candidate constant assigned thereof in response to the vote cast for the candidate by the voter.

For example:
The unique key is abbreviated as 'unique key';
The candidate constants are abbreviated as 'NC_A', 'NC_B', 'NC_C', 'NC_D' for candidates A, B, C and D contesting the elections, respectively; and
Initialization constant is abbreviated as 'MAC_init'. In accordance with an embodiment of the invention, MAC is the Message Authentication Code (MAC).
In view of the above, for the first vote cast by the voter resulted in corresponding encrypted vote tag being generated, i.e. MAC_1=MAC_Method (Vote1, unique key, MAC_0),
where MAC_1 is the encrypted vote tag, which is generated based on the candidate constant assigned in response to the vote cast by the voter for the respective candidate. For instance, if the voter cast the vote for candidate A, then vote 1 would be recorded as NC_A, MAC_0 is the initialization constant.
Further, with respect to the second vote cast by the second voter, the encrypted vote tag generated is given by:
MAC_2=MAC_Method (vote2, unique key, MAC_1)
Where, MAC_2 will be generated based on the preceding tag MAC_1 and the unique key.

In an embodiment, the encrypted vote tag is provided to the voter in a voting receipt. The voting receipt is generated by the encrypted tag generation unit 116, such as, but not limited to, a printer. The voting receipt indicating information of the vote tag and the preceding vote tag.

In another embodiment of the invention, the encrypted vote tag is transmitted to a communication unit operated by the voter. The communication unit can be one of, but not limited to, a mobile phone, a laptop and a desktop. The encrypted vote tag can be transmitted to the communication unit of the voter via wired and/or wireless connections in response to the voter providing personal details including one of, but not limited to, a phone number and email-id.

At step 406, upon presenting the encrypted vote tag at the verification machine 120, the scanner 126 of the verification machine 120 scans the encrypted vote tag to retrieve information of the vote tag.

At step 408, a confirmation including a replication of the vote recorded at the ballot machine 110 for the corresponding candidate, in response to scanning the encrypted vote tag is provided by the second computer processor 124 of the verification machine 120.

Figure 4B:
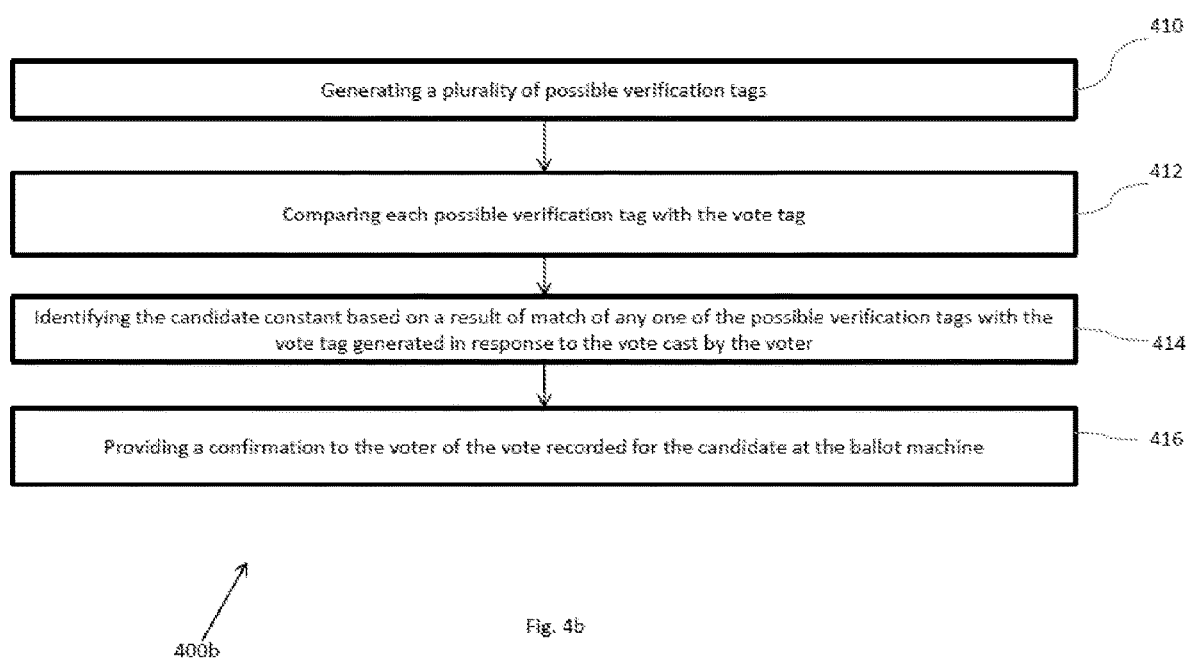
FIG. 4b shows a flowchart of a method of providing a confirmation of a vote cast by a voter with accordance to the method illustrated in FIG. 4a, according to one or more embodiments of the present invention.

FIG. 4b shows a flowchart of a method 400b of providing the confirmation in accordance to step 408 of method 400a. The method 400b is performed by the second computer processor 124 of the verification machine 120. The method 400b comprises the steps as indicated below:

At step 410, a plurality of possible verification tags are generated. Each of the possible verification tag is generated corresponding to each candidate out of the plurality of candidates contesting the election. Each possible verification tag is generated for the candidate based on the preceding tag and the candidate constant assigned to the candidate.

For example:
The unique key is abbreviated as 'unique key' or 'MAC_Key';
The candidate constants are abbreviated as 'NC_A', NC_D' for candidates A, B, C and D contesting the elections, respectively; and Initialization constant is 'MAC_Init';
Let us consider the first vote cast by voter resulted in generation of encryption of vote tag MAC_1. The encrypted vote tag is presented to the verification machine 120 of the system 100.
MAC_Method, unique key, NC_A, B, C and D are all exactly same as the one used to generate the encrypted vote tag at the ballot machine 110 of the system 100. The verification machine 120 generates a plurality of possible verification tags for encrypted vote tag MAC_1. The plurality of possible verification tags generated for MAC_1 are listed below:
MAC_1_possibility_A;
MAC_1_possibility_B;
MAC_1_possibility_C; and
MAC_1_possibility_D.
Where:
MAC_1_possibility_A=MAC_Method (NC_A, Unique Key, MAC_0)
MAC_1_possibility_B=MAC_Method (NC_B, Unique Key, MAC_0)
MAC_1_possibility_C=MAC_Method (NC_C, Unique Key, MAC_0)
MAC_1_possibility_D=MAC_Method (NC_D, Unique Key, MAC_0)
For the next subsequent votes, the MAC_0 is replaced by the immediate preceding encrypted tag MAC_(X-1);

At step 412, each possible verification tag is compared with the vote tag generated in response to the vote cast by the voter at the ballot machine.

For example, vote tag MAC_1, when presented at the verification machine 120, is compared against each possible verification tag of the plurality of possible verification tags as generated above, i.e. MAC_1 is compared with the plurality of possible verification tags (MAC_1_Possibility).

At step 414, the candidate constant is identified based on a result of match of any one of the possible verification tags with the vote tag generated in response to the vote cast by the voter.

In view of the above, based on comparison of MAC_1 with the plurality of possible verification tags, i.e. MAC_1_possibility, the candidate constant is identified based on a match of any one of the possible verification tag. For example, if the vote was cast for candidate A, a match would be found against MAC_1_possibility_A. Advantageously, by utilizing cryptographic properties of a MAC ensures there is always a match found and that there is only one unique match in the plurality of possible verification tags.

At step 416, a confirmation is provided to the voter of the vote recorded for the candidate at the ballot machine. The confirmation includes illuminating an LED corresponding to the candidate on the second I/O interface for which the voter casted the vote.

In accordance with an embodiment of the invention, the preceding vote tag is identified by the verification machine in response to presenting the encrypted vote tag at the scanner of the verification machine. Further, the preceding vote tag is stored in the second memory 124 such as, but not limited to, a non-volatile memory. In an alternate embodiment, the immediate preceding tag is stored in the second memory such as, but not limited to, a random access memory (RAM) until the subsequent encrypted vote tag is presented at the verification machine.

Figure 5A:
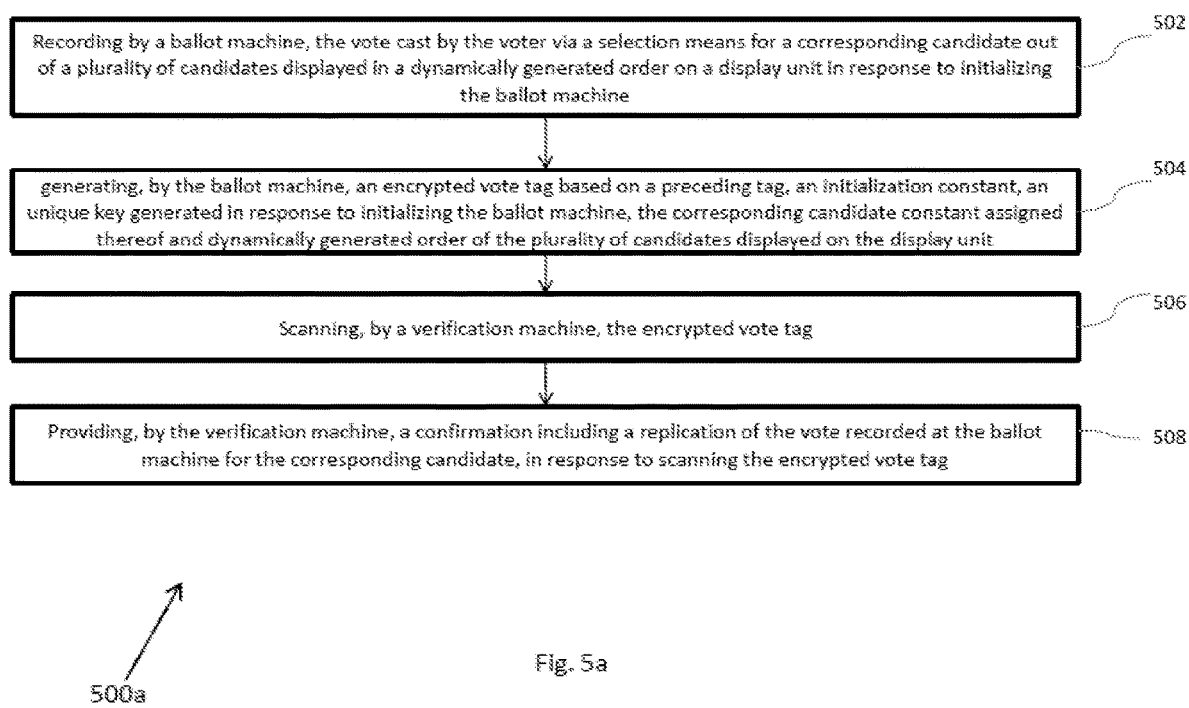
FIG. 5a shows a flowchart of a computer implemented method for verifying a vote cast by a voter, according to one or more embodiments of the present invention.
Figure 6:
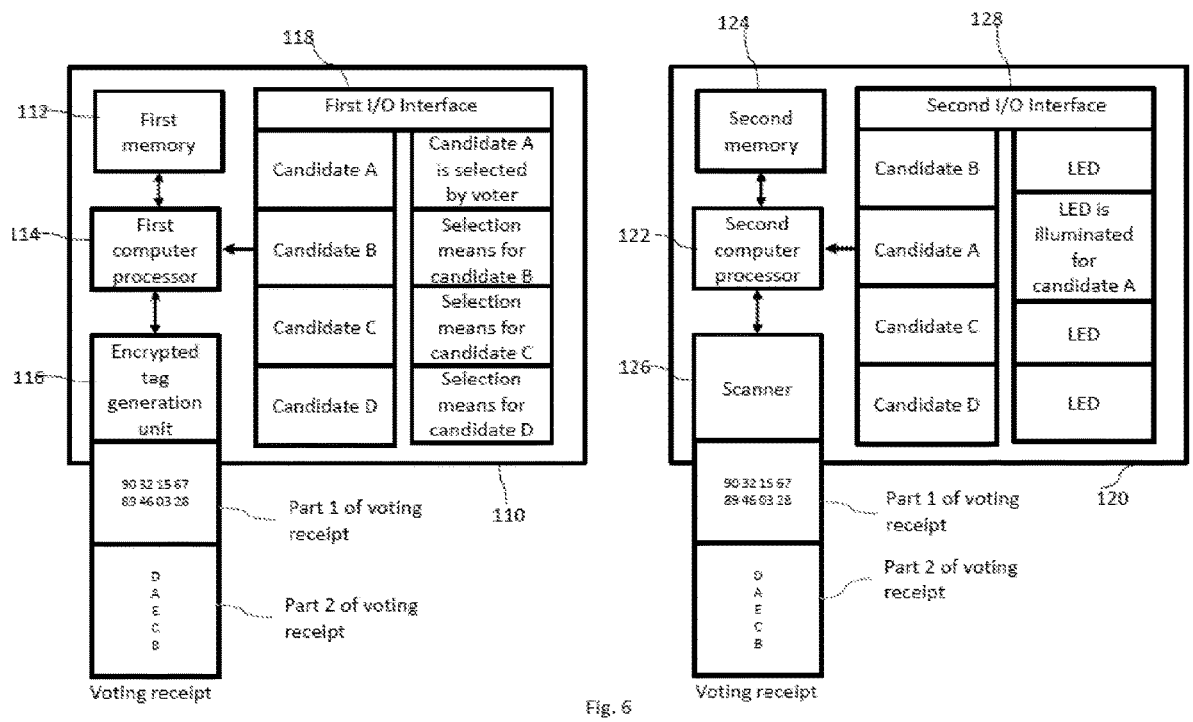
FIG. 6 illustrates a working example of the system as illustrated in FIG. 1, according to one or more embodiments of the present invention.

FIG. 5a shows a flowchart of a computer implemented method 500a for verifying a vote cast by a voter in accordance with another embodiment of the invention. For the purpose of description, the method 500a is described with the embodiment as illustrated in FIG. 6. FIG. 6 illustrates a working example of system 100 illustrated in FIG. 1. The method comprises the steps as indicated below:

At step 502, the vote cast by the voter via the first I/O interface 118 is recorded at the first memory 114 of the ballot machine 110. The vote is recorded for a corresponding candidate out of a plurality of candidates displayed in a pre-defined order on the first I/O interface 118 in response to initializing the ballot machine 110. The vote recorded is stored along with a corresponding candidate constant assigned to the candidate, wherein the plurality of candidates are assigned a plurality of candidate constants, respectively.

For example, let us consider candidates A, B, C and D are contesting the election. The candidates A, B, C and D can be displayed on the first I/O interface 118 in a pre-defined order of preference. Let us consider, that the voter casts the vote for candidate A. In this regard, the vote recorded is assigned a candidate constant. For example, the candidate constant for candidate A is NC_A which is recorded in response to the vote cast by the voter.

At step 504, an encryption of a vote tag is generated by the first computer processor 114 of the ballot machine 110 based on a preceding tag, a unique key generated in response to initializing the ballot machine 110 and the corresponding candidate constant assigned thereof. In an embodiment, the encrypted vote tag is generated as a voting receipt. For the mixed mode scenario, the voting receipt may include two parts as shown in FIG. 6. The first part may include the information of the vote tag, the preceding tag and the unique key. The second part of the voting receipt may include information of the dynamically generated order.

For example:
The unique key is abbreviated as 'unique key';
The candidate constants are abbreviated as 'NC_A', 'NC_B', 'NC_C', 'NC_D' for candidates A, B, C and D contesting the election, respectively;

Initialization constant is abbreviated as 'MAC_init'. In accordance with an embodiment of the invention, MAC is the Message Authentication Code (MAC).

In view of the above, for the first vote recorded, the corresponding encrypted vote tag generated will be:
–MAC_1=MAC (vote1, unique key, MAC_0),
where MAC_1 is the encrypted vote tag, which is generated based on the candidate constant assigned in response to the vote cast by the voter for the respective candidate, the unique key and the initialization constant.

For instance, if the voter cast the vote for candidate A, then vote 1 would be recorded as NC_A.
MAC_0 is the initialization constant.
Further, with respect to the second vote cast by the second voter, the encrypted vote tag generated is given by:
MAC_2=MAC_Method (vote2, unique key, MAC_1)
Where, MAC_2 will be generated based on the preceding tag MAC_1 and the unique key.

At step 506, the encrypted vote tag is scanned by the scanner 126 of the verification machine 120 to retrieve information of the vote tag. With reference to FIG. 6, the voting receipt including two parts is presented at the scanner 126 of the verification machine 120.

At step 508, a confirmation including a replication of the vote recorded at the ballot machine 110 for the corresponding candidate is provided by the second computer processor 122 of the verification machine 120, in response to scanning the encrypted vote tag.

Figure 5B:
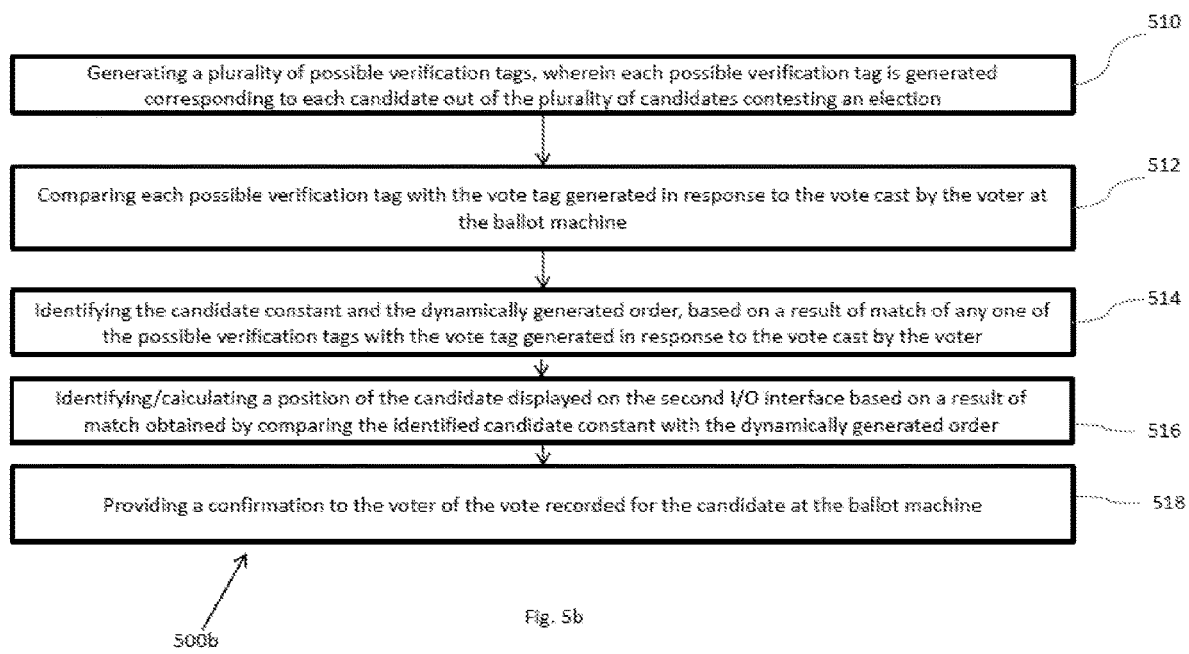
FIG. 5b shows a flowchart of a method of providing confirmation of a vote cast by a voter with accordance to the method as illustrated in FIG. 5a, according to one or more embodiments of the present invention.

FIG. 5b shows a flowchart of a method 500b of providing the confirmation in accordance to step 508 of method 500a. The method 500b is performed by the second computer processor 122 of the verification machine 120. The method 500b comprises the steps as indicated below:

At step 510, a plurality of possible verification tags are generated. Each possible verification tag is generated corresponding to each candidate out of the plurality of candidates contesting an election. Each possible verification tag is generated for the candidate based on the preceding tag and the candidate constant assigned to the candidate.

For example:
The unique key is abbreviated as 'unique key' or 'MAC_Key';
The candidate constants are abbreviated as 'NC_A', 'NC_B', 'NC_C', 'NC_D' for candidates A, B, C and D contesting the elections, respectively; and Initialization constant is 'MAC_Init';
Let us consider the first vote cast by voter resulted in generation of encryption of vote tag MAC_1. The encrypted vote tag is presented to the verification machine 120 of the system 100.
MAC_Method, unique key, NC_A, B, C and D are all exactly same as the one used to generate the encrypted vote tag at the ballot machine 110 of the system 100. The verification machine 120 generates a plurality of possible verification tags for encrypted vote tag MAC_1. The plurality of possible verification tags generated for MAC_1 are listed below:
MAC_1_possibility_A;
MAC_1_possibility_B;
MAC_1_possibility_C; and
MAC_1_possibility_D.
Where:
MAC_1_possibility_A=MAC_Method (NC_A, Unique Key, MAC_0)
MAC_1_possibility_B=MAC_Method (NC_B, Unique Key, MAC_0)

MAC_1_possibility_C=MAC_Method (NC_C, Unique Key, MAC_0)
MAC_1_possibility_D=MAC_Method (NC_D, Unique Key, MAC_0)

For the next subsequent votes, the MAC_0 is replaced by the immediate preceding encrypted tag MAC_(X-1);

At step 512, the plurality of possible verification tags are compared with the vote tag generated in response to the vote cast by the voter at the ballot machine 110.

For example, vote tag MAC_1, when presented at the verification machine 120, is compared against each possible verification tag of the plurality of possible verification tags as generated above, i.e. MAC_1 is compared with the plurality of possible verification tags (MAC_1_Possibility).

At step 514, the candidate constant and the dynamically generated order are identified, based on a result of match of any one of the possible verification tags with the vote tag generated in response to the vote cast by the voter.

in view of the above, based on comparison of MAC_1 with the plurality of possible verification tags, i.e. MAC_1_possibility, the candidate constant is identified based on a match of any one of the possible verification tag. For example, if the vote was cast for candidate A, a match would be found against MAC_1_possibility_A.

Further, the dynamically generated order for the current vote tag is identified. Let us consider, the dynamically generated order for the current example is {NC_D, NC_A, NC_C, NC_B}. In a preferred embodiment, the dynamically generated order is identified based on the part 2 of the voting receipt as shown in FIG. 6. At step 516, a position of the candidate displayed on the second I/O interface based on a result of match obtained by comparing the identified candidate constant with the dynamically generated order is identified. Pursuant to which, at step 518, a confirmation is provided to the voter of the vote recorded for the candidate at the ballot machine 110. The confirmation including the replication of the vote recorded at the ballot machine 110 for the corresponding candidate. In an embodiment of the invention, the confirmation is provided to the voter by scanning the encrypted vote tag at the scanner 126 of the verification machine 120. While scanning, the information pertaining to the encrypted vote tag and the dynamically generated order of the candidates 128 are considered by the second computer processor 122. Further, the candidate constant which is identified is compared with the dynamically generated order. In the current example, NC_A is compared against the dynamically generated order, i.e. {NC_D, NC_A, NC_C, NC_B}, to identify/calculate a position of a match, which is position 2, wherein the position is calculated from a pre-defined left direction to a right direction of the dynamically generated order. The left most position indexed at 1. Based on the identified position, choice of the voter/vote recorded at the ballot machine 110 is indicated on the verification machine 120. Here since the position was 2, the second LED would be illuminated to highlight voter choice, thereby providing confirmation of the vote recorded by the ballot machine. Cryptographic properties of a MAC ensure there is always a match found and that there is only one unique match in the plurality of possible verification tags.

The methods 400*a*, 400*b*, 500*a* and 500*b* as illustrated in FIG. 4*a*, 4*b*, 5*a*, 5*b*, respectively are utilized for verifying the vote cast by the voter. Advantageously, if there is any tampering/modification of the vote recorded at the ballot machine, the verification machine will notify the voter of the same. For example, as shown in FIG. 6, the voter voted for candidate A out of candidates A, B, C and D at the ballot machine. Thereafter, when the encrypted vote tag that is generated is presented at the verification machine 120, only the light emitting diode (LED) representing candidate A is required to be illuminated. If, any other light emitting diode (LED) corresponding to candidate B, C and D is illuminated, then it is to be understood that there has been tampering/modification of the vote recorded at the ballot machine 110. In these situations, the voter can initiate a protest by providing a voting receipt as proof to an election commission. Further, other votes recorded at the ballot machine can also be verified to check if there has been any tampering/modification of votes cast by voters.

In accordance to an embodiment of the invention, once all the voters have cast the votes, a member of the election commission or the first computer processor 114 of the ballot machine 110 automatically records a dummy vote. By recording the dummy vote, it is understood that a final vote is cast and the voting process is concluded. Accordingly, no vote is recorded against any of the candidate out of the plurality of candidates contesting the election for the dummy vote.

Figure 7:
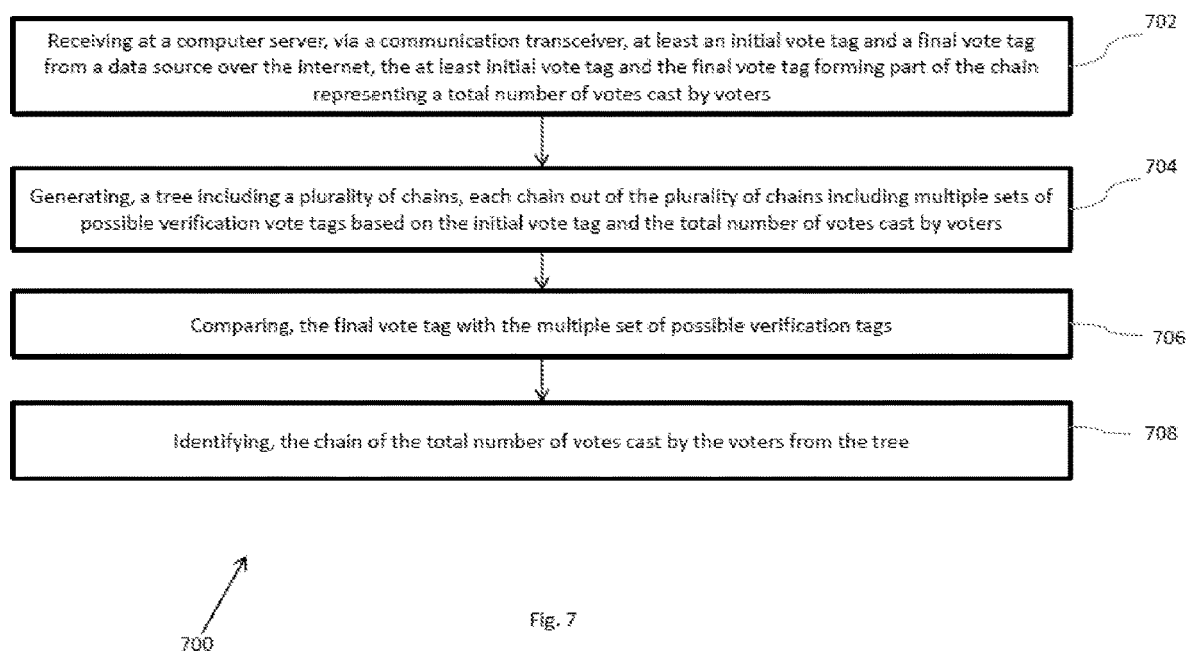
FIG. 7 shows a flowchart of a computer implemented method for identifying a chain of a total number of votes cast by voters, according to one or more embodiments of the present invention.
Figure 8:
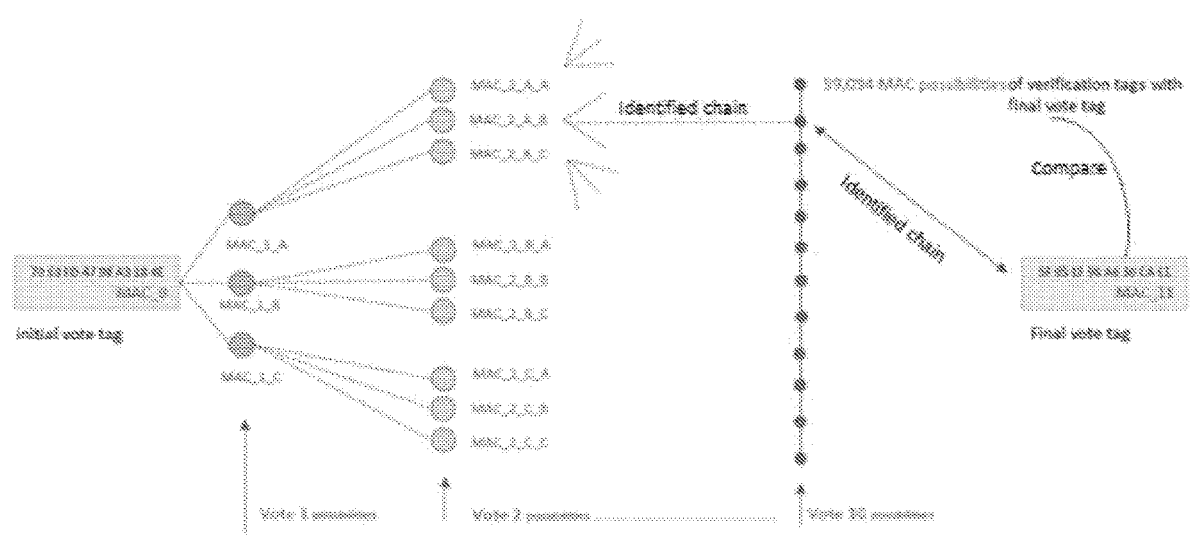
FIG. 8 illustrates a working example of identifying a chain of a total number of votes cast by voters, according to one or more embodiments of the present invention.

Once the voting process is concluded, the counting process commences. To maintain transparency of the election, any third party such as auditors are called upon to perform voting. In order to further increase the integrity of the counting process, the auditors may be only provided with the initial vote tag and the final vote tag of a chain of total number of votes cast by voters. Advantageously, by doing this eliminates risks of tampering/modifying the votes cast by voters. Accordingly, the auditors before commencing the counting process have to first identify the chain of the total number of votes cast by the voters. FIG. 7 shows a flowchart of a computer implemented method for identifying a chain of a total number of votes cast by voters. For the purpose of description, the method 700 is illustrated with respect to embodiments as shown in FIG. 8. FIG. 8 illustrates a working example of identifying a chain of a total number of votes cast by voters. The method 700 comprises the steps as indicated below:

At step 702, at least an initial vote tag and a final vote tag from a data source are received at a computer server via a communication transceiver over the internet. The at least initial vote tag and the final vote tag forming part of the chain representing a total number of votes cast by voters. The computer server includes the communication transceiver, a storage unit and one or more processors coupled to a memory. If the total number of votes cast by voters is not received at the computer server, then the total number of vote tags are required to be re-generated at the computer server. The below steps indicate the same.

At step 702, the one or more processors generate a tree including a plurality of chains. Each chain out of the plurality of chains includes multiple sets of possible verification vote tags based on the initial vote tag and the total number of votes cast by voters. Each set of the multiple sets including a plurality of possible verification tags being generated for each candidate out of a plurality of candidates contesting an election. The example as shown in FIG. 8 indicates three candidates A, B and C contesting the election and ten votes are recorded. The initial vote tag and the final vote tag are received at the computer processor. For the three candidates A, B and C respectively, the multiple sets of possible verification tags are generated for the first, second . . . tenth vote, respectively, subsequent to the initial vote tag. In an embodiment of the invention, the initial vote tag is generated based on an initialization constant. The initial vote tag doesn't represent any vote. Purpose of having an initial vote tag is to publish start of a chain including a total number of vote tags. The initial vote tag and the final vote tag can be published on an online portal or any other means accessible by public.

At step 704, the one or more processors compare, the final vote tag with the multiple sets of possible verification tags of each chain out of the plurality of chains. As shown in FIG. 8, 59094 possible verification tags are compared with the final vote tag.

At step 706, the chain is identified from the plurality of chains of the tree. The chain defines the total number of votes as the vote tags cast by the voters. The chain is identified from the plurality of chains based on a result of match of any one of the possible verification tag with the final vote tag. The chain which includes the possible verification tag matching with final vote tag based on the comparison is identified as the chain including the total number of votes cast. The chain indicating the plurality of vote tags including the initial vote tag, the final vote tag and one or more intermediate vote tags. From FIG. 8, the final vote tag matches with the possible verification tag MAC_2_A_B. Hence, the chain including the possible verification tag MAC_2_A_B is identified and considered as the chain which includes the total number of votes cast by the voters.

Figure 9:
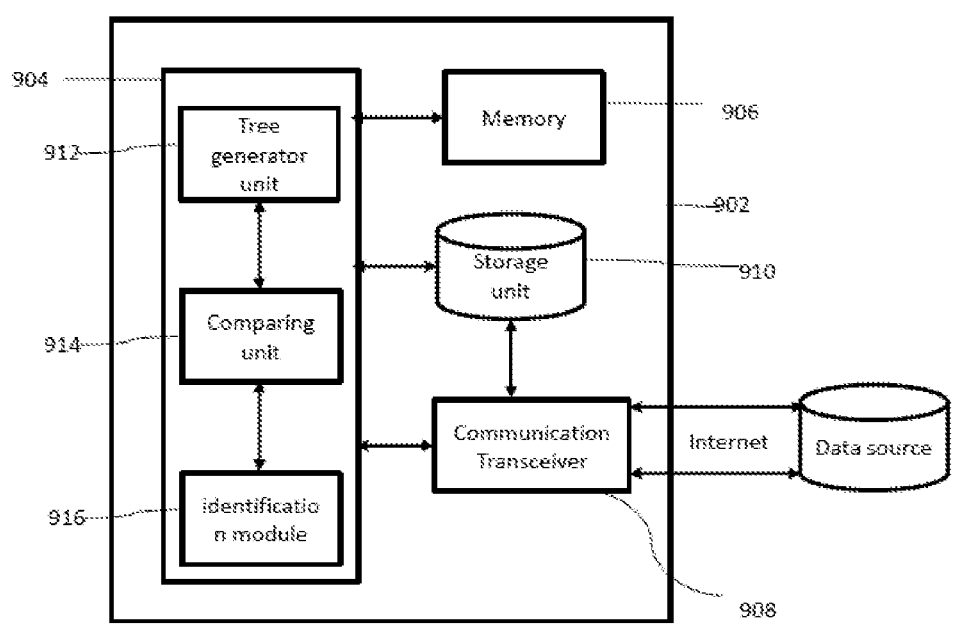
FIG. 9 illustrates a system for identifying a chain of a total number of votes cast by voters, according to one or more embodiments of the present invention.
Figure 9:

FIG. 9 illustrates a system 900 for identifying a chain of a total number of votes cast by voters. The system 900 comprises a computer server 902 including, one or more processors 904, a memory 906, a communication transceiver 908 and a storage unit 910.

Within the computer server 902, the communication transceiver 908 is in communication with the one or more processors 904. The one or more processors 904 is in communication with the memory 906 and the storage unit 910 is in communication with the one or more processors 904.

The processor 904 includes a tree generator unit 912 in communication with a comparing unit 914. The comparing unit 914 is in communication with an identification module 916.

In accordance with an embodiment of the invention, the communication transceiver 908 receives at least an initial vote tag and a final vote tag of the chain from a data source over the internet and stores at the storage unit 910. The data source including the chain of the initial vote tag and the final vote tag forming start and end of the chain. The chain including the total number of votes cast by voters stored as the plurality of vote tags.

The one or more processors 904 of the computer server 902 includes the tree generator unit 912 configured to generate a tree including a plurality of chains. Each chain out of the plurality of chains includes multiple sets of possible verification vote tags based on the initial vote tag and the total number of votes cast by voters. Each set of the multiple sets includes a plurality of possible verification tags being generated for each candidate out of a plurality of candidates contesting an election.

The comparing unit 914 present within the one or more processors 904 is configured to compare the final vote tag with the multiple sets of possible verification tags.

The identification module 916 present within the one or more processor 904 is configured to identify the chain of the total number of votes cast by the voters from the tree. The chain is identified from the plurality of chains based on a result of a match of any one of the possible verification tag of the chain with the final vote tag based on the comparison. The chain indicating the plurality of vote tags including the initial vote tag, the final vote tag and one or more intermediate vote tags.

Pursuant to identifying the chain of the total number of votes cast by the voters with accordance to system and method described in FIGS. 7, 8 and 9, the counting process is initiated by the auditors. The counting process can be either performed by the election commission or a third party agency (herein, we term them as auditors). The auditors are required to arrive at a location for counting the votes. The auditors can bring their own computing devices such as, but not limited to, desktop, laptop, tablet and mobile phones. Further, the auditors can also carry their own one or more external devices, such as, but not limited to, smart card. The smart cards brought by the auditors can include candidate constants and the initialization constant which are published in the online portal as shown in FIG. 3 before voting process commences. The smart cards are submitted to the election commission by the auditors. The election commission will check for authenticity of the smart cards and if they are proved to be authentic, load them with unique keys. The unique keys loaded by any member of the election commission can be used during normal as well mixed mode scenarios of the system 100. However, the auditors cannot decipher the actual values of the unique keys. Advantageously, this ensures voter privacy and transparency. Therefore, secure smart cards are required to be used which do not allow tampering/modification of the unique keys. Further, the initialization constant and the candidate constants can either be loaded by the election commission or the auditors themselves can load them, since the initialization constant and the candidate constants are published prior to commencing voting. Once loaded, the one or more external devices, herein the smart card is inserted into the smart card slot of the computing device. The chain including the total number of votes stored in a data source can be transmitted to the computing device. In another embodiment, the total number of votes stored in a data source can be loaded on any peripheral devices, such as, but not limited to, hard disk, flash drive, etc by the election commission and stored in the computing device by inserting the peripheral device therein. In a preferred embodiment, to maintain security while counting, the computing device provided to the auditors or brought by the auditors may not be able to communicate with any device once the counting commences.

Figure 10:
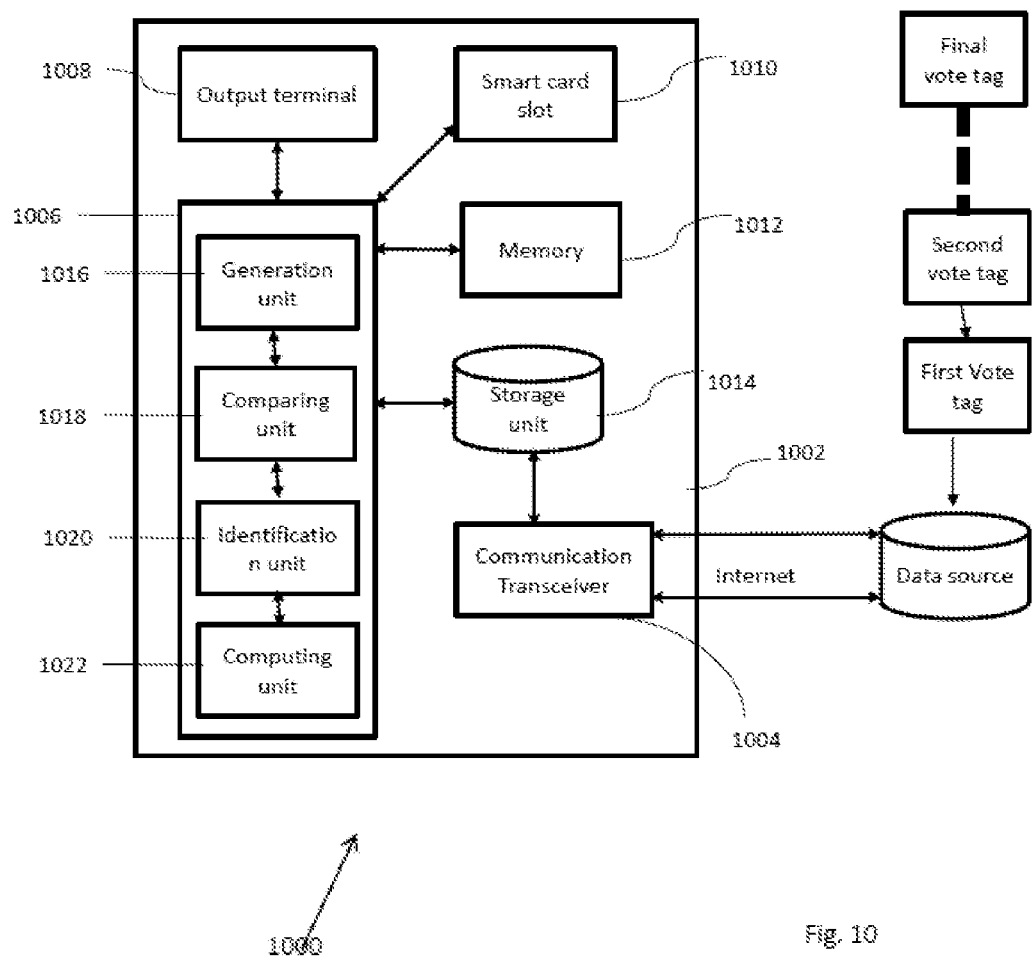
FIG. 10 illustrates a system for counting one or more votes cast by voters, according to one or more embodiments of the present invention.

FIG. 10 illustrates a system for counting one or more votes cast by voters. The system comprises a computing device 1002 including one or more processors 1004, a memory 1006, a communication transceiver 1008 and a storage unit 1010. The processor 1004 is coupled to the memory 1006.

Within the processor 1006, a generation unit 1016 is in communication with a comparing unit 1018. The comparing unit is in communication with an identification unit 1020. The identification unit 1020 is in communication with a computing unit 1022.

The communication transceiver 1004 receives a chain including a total number of votes and stores it at the storage unit 1014 as a plurality of vote tags, wherein, each vote tag out of the plurality of vote tags being generated based on a preceding tag.

The generation unit 1016 of the processor 1006 is configured to generate, a plurality of possible verification tags for each of the vote tag. The plurality of possible verification tags are generated based on a preceding tag of the respective vote tag. Each possible verification tag being generated for each candidate out of a plurality of candidates contesting an election.

The comparing unit 1018 of the processor 1006 is configured to compare, the plurality of possible verification tags with the vote tag.

The identification unit 1020 of the processor 1006 is configured to Identify, a candidate constant based on a result of match of any one of the possible verification tags with the vote tag based on the comparison.

The computing unit 1022 of the processor 1006 is configured to confirm and record, a vote for the candidate based on the identified candidate constant thereof.

The one or more votes cast by the voters are counted until a final vote tag is identified by the processor 1006 from the chain of the plurality of vote tags.

Figure 11:
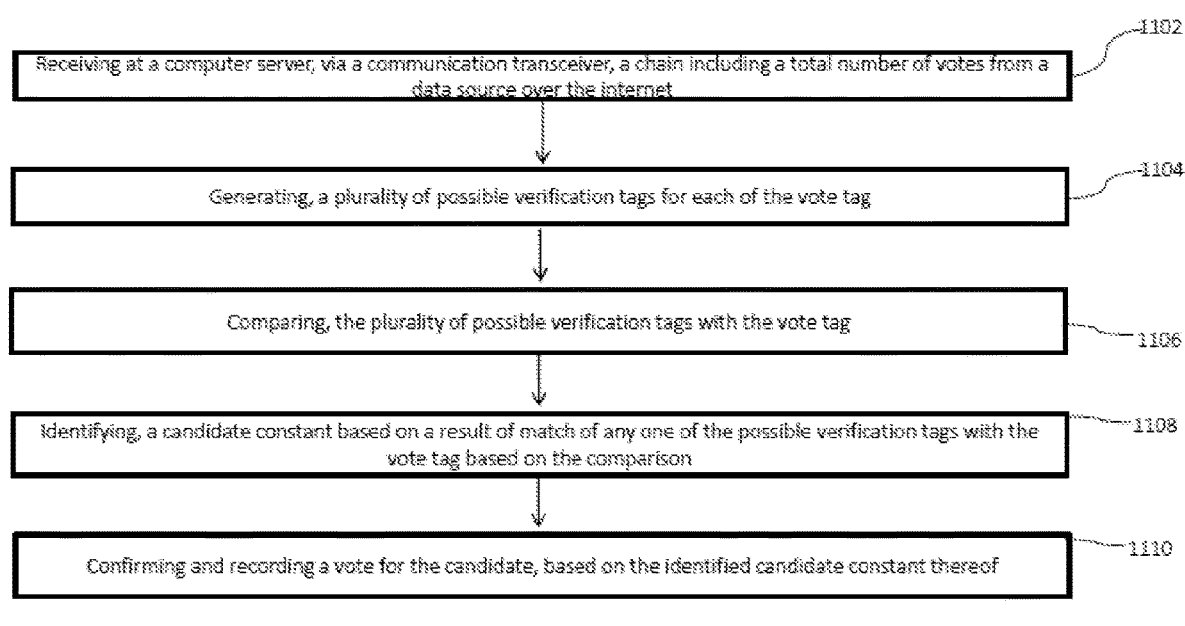
FIG. 11 shows a flowchart of a computer implemented method for counting one or more votes cast by voters, according to one or more embodiments of the present invention.

FIG. 11 shows a flowchart of a computer implemented method for counting one or more votes cast by voters. For the purpose of description, the method 1100 is illustrated with reference to the embodiment in FIG. 10 and FIG. 12, respectively. FIG. 10 illustrates a system 1000 for counting one or more votes cast by voters. The system 1000 comprises a computing device 1002. The computing device 1002 including a communication transceiver 1004, one or more processors 1006, an output terminal 1008, a smart card slot 1010, a memory 1012 and a storage unit 1014.

Figure 12:
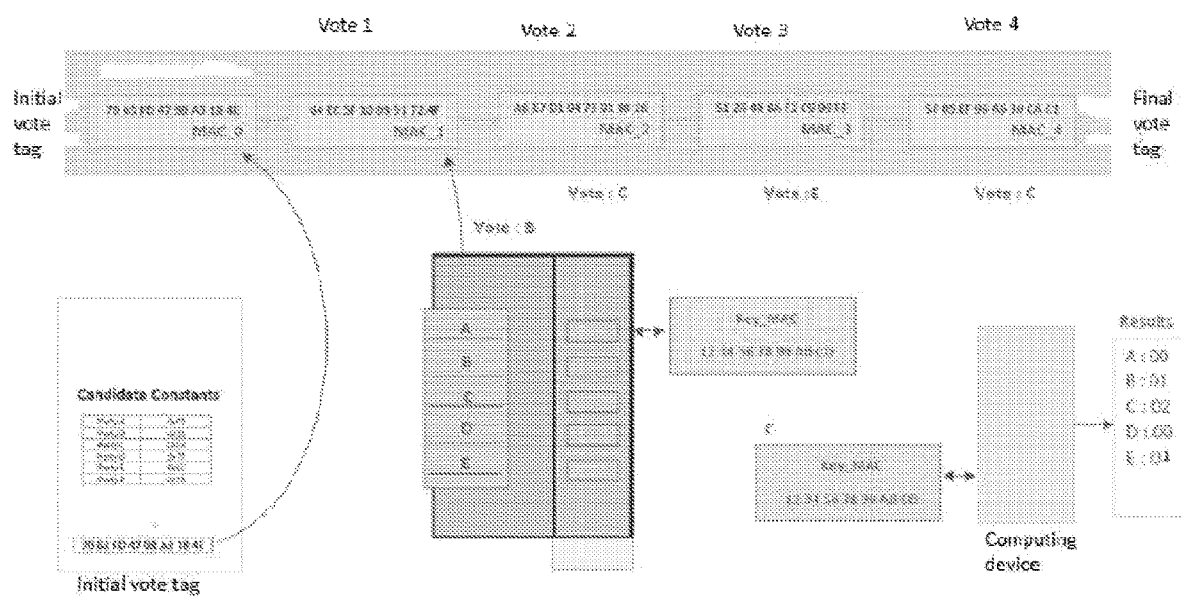
FIG. 12 illustrates a working example of counting one or more votes cast by voters, according to one or more embodiments of the present invention.

Each of the communication transceiver 1004, the smart card slot 1010, the memory 1012 and the storage unit 1014 are communicably coupled to the one or more processors 1006. The one or more processors 1006 coupled to the memory 1012 including instructions is configured to perform the following steps:

Further, FIG. 12 illustrates a working example of counting one or more votes cast by voters, according to one or more embodiments of the present invention. The steps of the method 1100 is illustrated below:

At step 1102 of the method 1100, a chain including a total number of votes is received from a data source over the internet at the computing device 1002 via the communication transceiver 1004. The total number of votes being stored at the storage unit 1014 as a plurality of vote tags. Each vote tag out of the plurality of vote tags being generated based on a preceding tag. In the example shown in FIG. 12, the chain including the total number of votes including the initial vote tag and the final vote tag are received at the computing device 1002. In the example illustrated in FIG. 12, the initial vote tag is based on the initialization constant. For the vote tag related to vote 1, the preceding tag would be the initial vote tag. Further, for vote tag related to vote 2, the preceding tag would be vote 1 and so on.

At step 1104, a plurality of possible verification tags for each of the vote tag is generated. The plurality of possible verification tags is generated based on the preceding tag of the vote tag. Each possible verification tag being generated for each candidate out of a plurality of candidates contesting an election. For example, for the vote tag related to vote 1, the plurality of possible verification tags are generated based on the vote tag related to the initial vote tag, i.e. the preceding tag. Each of the possible verification tag of the plurality of possible verification tags being generated based on the number of candidates contesting the election. In the present example, there are 5 candidates contesting the election, i.e. A, B, C, D and E. Accordingly, 5 possible verification vote tags are generated for the vote tag related to vote 2 based on the preceding vote tag related to vote 1.

At step 1106, the plurality of possible verification tags are compared with the vote tag. In the present example, with reference to vote 2, each of the possible verification tag out of the plurality of possible verification tags is compared with the vote tag related to vote 2.

At step 1108, a candidate constant is identified based on a result of match of any one of the possible verification tags with the vote tag based on the comparison. In the present example, based on the match of any of the possible verification tag with the vote tag related to vote 2, the candidate constant is identified.

At step 1110, a vote for the candidate is confirmed and recorded, based on the identified candidate constant thereof.

In accordance with an embodiment of the invention, the one or more votes cast by the voters are counted until a final vote tag is identified by the processor from the chain of the plurality of vote tags.

Pursuant to counting the total numbers of votes cast by the voters, the election commission can publish the list of vote tags on an online portal accessible by the public. In an alternate embodiment, the processor 1006 of the computing device 1000 may automatically publish the list of vote tags via the output terminal 1008 on the online portal without manual intervention. The voters can verify/check from the list of vote tags if their respective vote tag was considered by the election commission while counting the total number of votes.

Further during the counting process, the auditors can cross check the total number of vote tags published and verify if each of the vote tags were considered while counting the total number of votes by using the encrypted vote tags of the voter provided via means such as, but not limited to, voting receipt.

In yet another embodiment, during the mixed mode scenario, the auditors using the encrypted vote tag provided via means such as, but not limited to, the voting receipt including parts 1 and 2, can verify the vote tag from the published list.

In an embodiment of the invention, the auditors can use the voting receipt by collecting them from a repository such as, but not limited to, a secure physical or virtual storage device. The repository having provisions to receive the voting receipts containing the encrypted vote tag from the voters, pursuant to the voter verifying at the verification machine 120 the vote recorded by the ballot machine for the respective voter. By doing so, candidate representatives can also verify the vote tags, thereby ensuring that even if the auditors cannot be trusted, even then the system 100 can be used to negate any kind of blame/suspicions that may arise during the election scenario.

In an alternate embodiment, any individual/agency such as, but not limited to, voters, auditors, candidate representatives, etc can verify/tabulate the results of votes cast by checking the plurality of vote tags published in the online portal, when the voting receipts containing the encrypted vote tag are deposited in the repository as mentioned above.

In accordance to one or more embodiments of the invention, the initial vote tags, the final vote tags, the plurality of intermediate vote tags, the plurality of possible verification tags, the chain and the tree are all processed utilizing Message authentication Code (MAC). The MAC such as, but not limited to, AES-CMAC can be used, based on one of, but not limited to, OMAC1, NIST or other techniques can be utilized for ensuring key based data integrity. Nowhere in the description herein should it be construed as limiting the scope of the present invention by using only MAC.

Figure 13:
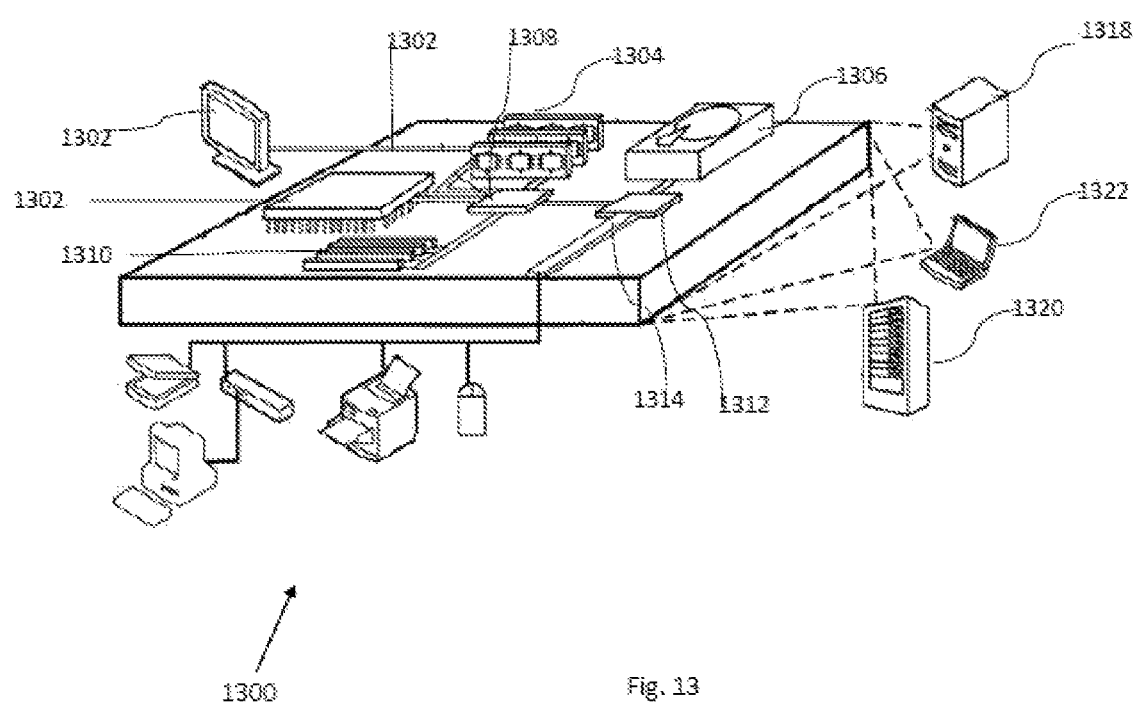
FIG. 13 is a block diagram of computing device that may be used to implement the systems and methods described in this document, according to or more embodiments of the present invention.

FIG. 13 is a block diagram of computing device 1300 that may be used to implement the systems and methods described in this document, as a server or plurality of servers. Computing device is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device includes a processor 1302, memory 1304, a storage device 1306, a high-speed interface 1308 connecting to the memory 1304 and high-speed expansion ports 1310, and a low speed interface 1312 connecting to low speed bus 1314 and storage device 1306. Each of the components 1302, 1304, 1306, 1308, 1310, 1312 and 1314, are interconnected using various busses, and may be mounted on a common motherboard or in other manners as appropriate. The processor 1302 can process instructions for execution within the computing device, including instructions stored in the memory or on the storage device to display graphical information for a GUI on an external input/output device, such as display 1316 coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1304 stores information within the computing device. In one implementation, the memory 1304 is a computer-readable medium. In one implementation, the memory is a volatile memory unit or units. In another implementation, the memory is a non-volatile memory unit or units.

The storage device 1306 is capable of providing mass storage for the computing device. In one implementation, the storage device 1306 is a computer-readable medium. In various different implementations, the storage device 1306 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory, the storage device, memory on processor, or a propagated signal.

The high-speed controller manages bandwidth-intensive operations for the computing device, while the low speed controller manages lower bandwidth-intensive operations. Such allocation of duties is exemplary only. In one implementation, the high-speed controller is coupled to memory, display (e.g., through a graphics processor or accelerator), and to high-speed expansion ports, which may accept various expansion cards (not shown). In the implementation, low-speed controller is coupled to storage device and low-speed expansion port. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device may be implemented in a number of different forms, as shown in the figure. For example, it may be implemented as a standard server 1318, or multiple times in a group of such servers. It may also be implemented as part of a rack server system 1320. In addition, it may be implemented in a personal computer such as a laptop computer 1322. Alternatively, components from computing device may be combined with other components in a mobile device (not shown), such as device. Each of such devices may contain one or more of computing device, and an entire system may be made up of multiple computing devices 800 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other categories of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

While aspects of the present invention have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present invention as determined based upon the claims and any equivalents thereof.

The invention claimed is:

1. A computer implemented method for verifying a vote cast by a voter, the method comprising the steps of:
   recording, by a ballot machine, the vote cast by the voter via a first I/O interface for a corresponding candidate out of a plurality of candidates, wherein the vote recorded is assigned a candidate constant, wherein the plurality of candidates are assigned a plurality of candidate constants, respectively;
   generating, by the ballot machine, an encryption of a vote tag based on a preceding tag, a unique key generated in response to initializing the ballot machine and the candidate constant assigned based on the vote cast by the voter for the corresponding candidate;
   scanning, by a verification machine, the encrypted vote tag to retrieve information of the vote tag; and
   providing, by the verification machine, a confirmation including a replication of the vote recorded at the ballot machine for the corresponding candidate, in response to scanning the encrypted vote tag;
   wherein the ballot machine and the verification machine are configured to operate in a mixed mode, and, responsive to being configured to operate in the mixed mode, the ballot machine presents the candidates in a first order, and the verification machine presents the candidates in a second, different order.

2. The method as claimed in claim 1, wherein each of the ballot machine and the verification machine are initialized by communicably coupling with one or more external devices.

3. The method as claimed in claim 2, wherein the one or more external devices include information relating to the unique keys, the plurality of candidate constants corresponding to the plurality of candidates contesting an election and the initialization constant.

4. The method as claimed in claim 1, wherein each of the ballot machine and the verification machine can be configured to operate in a normal mode or the mixed mode.

5. The method as claimed in claim 4, wherein in response to configuring each of the ballot machine and the verification machine to operate in the normal mode, the plurality of candidates displayed on a first I/O interface and a second I/O interface of the ballot machine and the verification machine, respectively are arranged in a pre-defined order, and the candidates are presented in the pre-defined order on both the ballot machine and the verification machine.

6. The method as claimed in claim 4, wherein the step of providing the confirmation in the normal mode includes:
   generating a plurality of possible verification tags, wherein each possible verification tag is generated corresponding to each candidate out of the plurality of candidates contesting an election, each possible verification tag is generated for the candidate based on the preceding tag and the candidate constant assigned to the candidate;
   comparing each possible verification tag with the vote tag;
   identifying the candidate constant based on a result of match of any one of the possible verification tag with the vote tag; and
   providing a confirmation to the voter of the vote recorded for the candidate at the ballot machine.

7. The method as claimed in claim 4, wherein in response to configuring each of the ballot machine and the verification machine to operate in the mixed mode, each of a first computer processor and a second computer processor of the ballot machine and the verification machine respectively, generate a dynamic order of the candidates.

8. The method as claimed in claim 7, wherein the step of providing the confirmation in the mixed mode includes:
   generating a plurality of possible verification tags, wherein each possible verification tag is generated corresponding to each candidate out of the plurality of candidates contesting an election, each possible verification tag is generated for the candidate based on the preceding tag and the candidate constant assigned to the candidate;
   comparing the plurality of possible verification tags with the vote tag;
   identifying the candidate constant and the dynamically generated order, based on a result of match of any one of the possible verification tags with the vote tag;
   identifying/calculating a position of the candidate displayed on the second I/O interface based on a result of match obtained by comparing the identified candidate constant with the dynamically generated order; and
   providing a confirmation to the voter of the vote recorded for the candidate at the ballot machine.

9. The method as claimed in claim 1, wherein the step of providing the confirmation includes illuminating a light emitting diode (LED) corresponding to the candidate on a second I/O interface for which the voter casted the vote.

10. The method as claimed in claim 1, wherein the preceding tag is identified by the verification machine when the preceding tag is stored in the verification machine or presented along with the encrypted vote tag at a scanner of the verification machine.

11. A system for verifying a vote cast by a voter, the system comprising:
   at least one ballot machine including:
      a first memory to record a vote cast by a voter via a first I/O interface for a corresponding candidate out of a plurality of candidates displayed on the first I/O interface, wherein the vote recorded is stored along with a corresponding candidate constant assigned to the candidate, wherein the plurality of candidates are assigned a plurality of candidate constants, respectively; and
      a first computer processor communicably coupled to the first memory, the first computer processor configured to generate an encryption of a vote tag based on a preceding tag, a unique key generated in response to initializing the ballot machine and the corresponding candidate constant assigned thereof in response to the vote cast for the candidate; and
   at least one verification machine including:
      a scanner to retrieve information of the vote tag from the encrypted vote tag; and a second computer processor communicably coupled to the scanner, the second computer processor configured to provide a confirmation including a replication of the vote recorded at the at least one ballot machine for the corresponding candidate, in response to scanning the encrypted vote tag;

wherein the ballot machine and the verification machine are configured to operate in a mixed mode, and, responsive to being configured to operate in the mixed mode, the ballot machine presents the candidates in a first order, and the verification machine presents the candidates in a second, different order.

12. The system as claimed in claim 11, wherein each of the at least one ballot machine and the at least one verification machine are initialized by communicably coupling with one or more external devices.

13. The system as claimed in claim 11, wherein the at least one ballot machine can be configured to operate in a normal mode or the mixed mode.

14. The system as claimed in claim 13, wherein the at least one ballot machine and the at least one verification when configured to operate in the normal mode, the plurality of candidates displayed on the first I/O interface and the second I/O interface respectively are arranged in a pre-defined order.

15. The system as claimed in claim 13, wherein the at least one ballot machine and the at least one verification machine when configured to operate in the mixed mode, each of the first processor and the second processor execute instructions present in one or more external devices to generate a dynamic order of the candidates.

16. A computer implemented method for identifying a chain of a total number of votes cast by voters, the method comprising the steps of:

receiving at a computer server, via a communication transceiver, at least an initial vote tag and a final vote tag from a data source over the internet, the at least initial vote tag and the final vote tag forming part of the chain representing a total number of votes cast by voters, wherein the computer server including the communication transceiver, a storage unit and one or more processors coupled to a memory;

wherein the one or more processors is configured for:

generating, a tree including a plurality of chains, each chain out of the plurality of chains including multiple sets of possible verification vote tags based on the initial vote tag and the total number of votes cast by voters, wherein each set of the multiple sets including a plurality of possible verification tags being generated for each candidate out of a plurality of candidates contesting an election;

comparing, the final vote tag with the multiple sets of possible verification tags; and identifying, the chain of the total number of votes cast by the voters from the tree, wherein the chain is identified from the plurality of chains based on a result of match of any one of the possible verification tag of the chain with the final vote tag based on the comparison, wherein the chain representing the plurality of vote tags including the initial vote tag, the final vote tag and one or more intermediate vote tags;

wherein:

the votes are cast on a ballot machine, and the votes are verified on a verification machine;

the ballot machine and the verification machine are configured to operate in a mixed mode; and responsive to being configured to operate in the mixed mode, the ballot machine presents the candidates in a first order, and the verification machine presents the candidates in a second, different order.

17. A system for identifying a chain of a total number of votes cast by voters, the system comprising:

a computer server including one or more processors, a memory and a communication transceiver, the communication transceiver receives at least an initial vote tag and a final vote tag from a data source over the internet and stores at a storage unit, the at least initial vote tag and the final vote tag forming part of the chain representing the total number of voters cast by voters;

the one or more processors including:

a tree generator unit configured to generate, a tree including multiple sets of possible verification vote tags based on the initial vote tag and the total number of votes cast by the voters, wherein each set of the multiple sets including a plurality of possible verification tags being generated corresponding to a plurality of candidates contesting an election;

a comparing unit configured to compare the final vote tag with the multiple set of possible verification tags; and an identification module configured to identify, the chain from the tree based on a result of match of any one of the possible verification tag with the final vote tag based on the comparison, wherein the chain representing the plurality of vote tags including the initial vote tag, the final vote tag and one or more intermediate vote tags;

wherein:

the votes are cast on a ballot machine, and the votes are verified on a verification machine;

the ballot machine and the verification machine are configured to operate in a mixed mode; and responsive to being configured to operate in the mixed mode, the ballot machine presents the candidates in a first order, and the verification machine presents the candidates in a second, different order.

18. A computer implemented method for counting one or more votes cast by voters, the method comprising the steps of:

receiving at a computing device, via a communication transceiver, a chain including a total number of votes from a data source over the internet, the computing device including one or more processors coupled to a memory, the communication transceiver and a storage unit, the total number of votes being stored at the storage unit as a plurality of vote tags, wherein, each vote tag out of the plurality of vote tags being generated based on a preceding tag, wherein the one or more processors is configured for:

generating, a plurality of possible verification tags for each of the vote tag, wherein the plurality of possible verification tags is generated based on the preceding tag of the vote tag, wherein each possible verification tag being generated for each candidate out of a plurality of candidates contesting an election;

comparing, the plurality of possible verification tags with the vote tag;

identifying, a candidate constant based on a result of match of any one of the possible verification tags with the vote tag based on the comparison; and confirming and recording, a vote for the candidate based on the identified candidate constant thereof;

wherein:
the votes are cast on a ballot machine, and the votes are verified on a verification machine;
the ballot machine and the verification machine are configured to operate in a mixed mode; and
responsive to being configured to operate in the mixed mode, the ballot machine presents the candidates in a first order, and the verification machine presents the candidates in a second, different order.

19. The method as claimed in claim 18, wherein the one or more votes cast by the voters are counted until a final vote tag is identified by the processor from the chain of the plurality of vote tags.

20. A system for counting one or more votes cast by voters, the system comprising:
a computing device including one or more processors coupled to a memory and a communication transceiver, the communication transceiver receives a chain including a total number of votes, the total number of votes being stored at a storage unit as a plurality of vote tags, wherein each vote tag out of the plurality of vote tags being generated based on a preceding tag;
the one or more processors including:
a generation unit configured to generate, a plurality of possible verification tags for each of the vote tag, wherein the plurality of possible verification tags are generated based on a preceding tag of the respective vote tag, wherein each possible verification tag being generated for each candidate out of a plurality of candidates contesting an election;
a comparing unit configured to compare, the plurality of possible verification tags with the vote tag;
an identification unit configured to identify, a candidate constant based on a result of match of any one of the possible verification tags with the vote tag; and
a computing unit configured to confirm and record, a vote for the candidate at the storage unit for the candidate based on the identified candidate constant thereof;
wherein:
the votes are cast on a ballot machine, and the votes are verified on a verification machine;
the ballot machine and the verification machine are configured to operate in a mixed mode; and
responsive to being configured to operate in the mixed mode, the ballot machine presents the candidates in a first order, and the verification machine presents the candidates in a second, different order.

\* \* \* \* \*